United States Patent
Advincula et al.

(10) Patent No.: US 12,234,404 B2
(45) Date of Patent: Feb. 25, 2025

(54) ACID MATRIX APPLICATIONS: WELL STIMULATION AND COMPLETION FLUIDS USING VISCOELASTIC SURFACTANTS AND MODIFIED ADDITIVES

(71) Applicant: Mitsubishi Gas Chemical Company, Inc., Chiyoda-ku (JP)

(72) Inventors: Rigoberto C. Advincula, Knoxville, TN (US); Kunitoshi Mimura, Chiyoda-ku (JP); Daisuke Ohno, Katsushika-ku (JP); Masahiro Shimada, Katsushika-ku (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 0 days.

(21) Appl. No.: 17/766,977

(22) PCT Filed: Oct. 7, 2020

(86) PCT No.: PCT/US2020/054584
§ 371 (c)(1),
(2) Date: Apr. 6, 2022

(87) PCT Pub. No.: WO2021/071952
PCT Pub. Date: Apr. 15, 2021

(65) Prior Publication Data
US 2024/0117234 A1     Apr. 11, 2024

Related U.S. Application Data

(60) Provisional application No. 62/911,671, filed on Oct. 7, 2019.

(51) Int. Cl.
*C09K 8/20*     (2006.01)

(52) U.S. Cl.
CPC .......... *C09K 8/206* (2013.01); *C09K 2208/10* (2013.01); *C09K 2208/30* (2013.01)

(58) Field of Classification Search
None
See application file for complete search history.

(56) References Cited

U.S. PATENT DOCUMENTS

| 6,035,936 A | 3/2000 | Whalen |
| 6,232,274 B1 | 5/2001 | Hughes et al. |

(Continued)

FOREIGN PATENT DOCUMENTS

| JP | 2-276870 A | 11/1990 |
| JP | 2009-155572 A | 7/2009 |

(Continued)

OTHER PUBLICATIONS

International Search Report issued Jan. 7, 2021 in PCT/US2020/054584 filed Oct. 7, 2020 (3 pages) with Written Opinion (6 pages).

(Continued)

*Primary Examiner* — John J Figueroa
(74) *Attorney, Agent, or Firm* — Oblon, McClelland, Maier & Neustadt, L.L.P.

(57) ABSTRACT

A composition for an oil or gas well formation, containing a viscoelastic surfactant; and a modified nanomaterial and a producing method of the composition, and a forming method of the oil or gas well. The modified nanomaterial optionally contains a nanocellulose. The modified nanomaterial optionally has, on its surface, a sulfate group, a sulfite group, a carboxy group, an ethylene oxide chain, an amino group, an ester group, a silane group, a tertiary ammonium group or a mixture thereof.

20 Claims, 20 Drawing Sheets

Adding CNC would make the CTAB-VES less transparent. With increasing concentration of CNC, the highest viscosity in HCl spending tests are increased. The viscosity at 0% and 18% are also increased.

(56) References Cited

U.S. PATENT DOCUMENTS

| | | | |
|---|---|---|---|
| 6,258,859 | B1 | 7/2001 | Dahayanake et al. |
| 6,881,709 | B2 | 4/2005 | Nelson et al. |
| 7,159,659 | B2 | 1/2007 | Welton et al. |
| 7,244,694 | B2 | 7/2007 | Fu et al. |
| 7,303,019 | B2 | 12/2007 | Welton et al. |
| 7,992,640 | B2 | 8/2011 | Huang et al. |
| 8,653,012 | B2 | 2/2014 | Huang |
| 9,034,806 | B2 | 5/2015 | Gurmen et al. |
| 9,145,510 | B2 | 9/2015 | Crews et al. |
| 9,284,482 | B2 | 3/2016 | Li et al. |
| 9,353,306 | B2 | 5/2016 | Svoboda et al. |
| 9,359,545 | B2 | 6/2016 | Pandya et al. |
| 11,674,071 | B2 * | 6/2023 | Monclin ........... C09K 8/10 507/101 |
| 11,898,085 | B2 * | 2/2024 | Goel ............... C09K 8/206 |
| 2005/0126786 | A1 | 6/2005 | Fu et al. |
| 2006/0118302 | A1 | 6/2006 | Fuller et al. |
| 2010/0331223 | A1 | 12/2010 | Li et al. |
| 2011/0152135 | A1 | 6/2011 | Chen et al. |
| 2013/0274149 | A1 * | 10/2013 | Lafitte ............. C09K 8/74 507/112 |
| 2014/0246198 | A1 | 9/2014 | Pandya et al. |
| 2015/0072902 | A1 * | 3/2015 | Lafitte ........... C09K 8/035 507/112 |
| 2016/0168443 | A1 * | 6/2016 | Lafitte .......... C04B 20/1029 507/112 |
| 2017/0145285 | A1 * | 5/2017 | Lafitte ........... C09K 8/035 |
| 2017/0362495 | A1 | 12/2017 | Sangaru et al. |

FOREIGN PATENT DOCUMENTS

| | | |
|---|---|---|
| JP | 2014-214255 A | 11/2014 |
| WO | WO2016/099841 A1 | 6/2016 |
| WO | WO2019/200283 A1 | 10/2019 |

OTHER PUBLICATIONS

Yang, J. "Viscoelastic wormlike micelles and their applications", Current Opinion in Colloid & Interface Science, vol. 7, Nov. 30, 2002, pp. 276-281.

Olsson, U. et al., "Characterization of Micellar Aggregates in Viscoelastic Surfactant Solutions. Nuclear Magnetic Resonance and Light Scattering Study", The Journal of Physical Chemistry, vol. 90, No. 21, Oct. 1986, pp. 5223-5232.

Fischer, P. et al., "Rheological Master Curves of Viscoelastic Surfactant Solutions by Varying the Solvent Viscosity and Temperature", Langmuir, vol. 13, No. 26, Dec. 24, 1997, pp. 7012-7020.

Samuel, M. et al., "Viscoelastic Surfactant Fracturing Fluids: Applications in Low Permeability Reservoirs", SPE (Society of Petroleum Engineers) International, Rocky Mountain Regional/Low-Permeability Reservoirs Symposium and Exhibition, 2000, 8 pages.

Lungwitz, B. et al., "Diversion and Cleanup Studies of Viscoelastic Surfactant-Based Self-Diverting Acid", SPE Production & Operations, Feb. 1, 2007 vol. 22, No. 01, pp. 121-127.

Huang, T. et al. "Nanotechnology Applications in Viscoelastic Surfactant Stimulation Fluids", SPE Production & Operations, Nov. 1, 2008, vol. 23, No. 04, pp. 512-517.

Hoffmann, H. et al., "The rheological behaviour of different viscoelastic surfactant solutions: Systems with and without a yield stress value", Tenside, Surfactants, Detergents, vol. 31, No. 6, 1994, pp. 389-400.

Fischer, P. et al., "Non-linear flow properties of viscoelastic surfactant solutions", Rheologica Acta, vol. 36, No. 1, Jan. 1, 1997, pp. 13-27.

Cooper-White, J.J. et al., "A drop impact study of worm-like viscoelastic surfactant solutions", Colloids and Surfaces A: Physicochemical and Engineering Aspects, vol. 210, No. 1, 2002, pp. 105-123.

Hull, K. L. et al., "Recent Advances in Viscoelastic Surfactants for Improved Production From Hydrocarbon Reservoirs", SPE Journal, 2016, pp. 1340-1357.

Yang, J. et al., "Supramolecular Viscoelastic Surfactant Fluid for Hydraulic Fracturing" SPE North Africa Technical Conference and Exhibition. Society of Petroleum Engineers, 2015, 10 pages.

* cited by examiner

Acid Sensitively of VES with 0.5 wt% cellulose NanoCrystal (CNC)

Cellulose NanoCrystal demonstrated an enhancement of viscosity of CTAB-NaSal system at low HCl concentration. -good at diverting
Cellulose NanoCrystal demonstrated no influence on the viscosity at high HCl concentration. -- generate less pumping pressure HCl Spending Test with 0.5 wt% Cellulose NanoCrystal Cellulose NanoCrystal demonstrated an enhancement in viscosity in the middle of spending curve – better diverting Cellulose NanoCrystal demonstrated no influence on the point of breaking – same good break down.

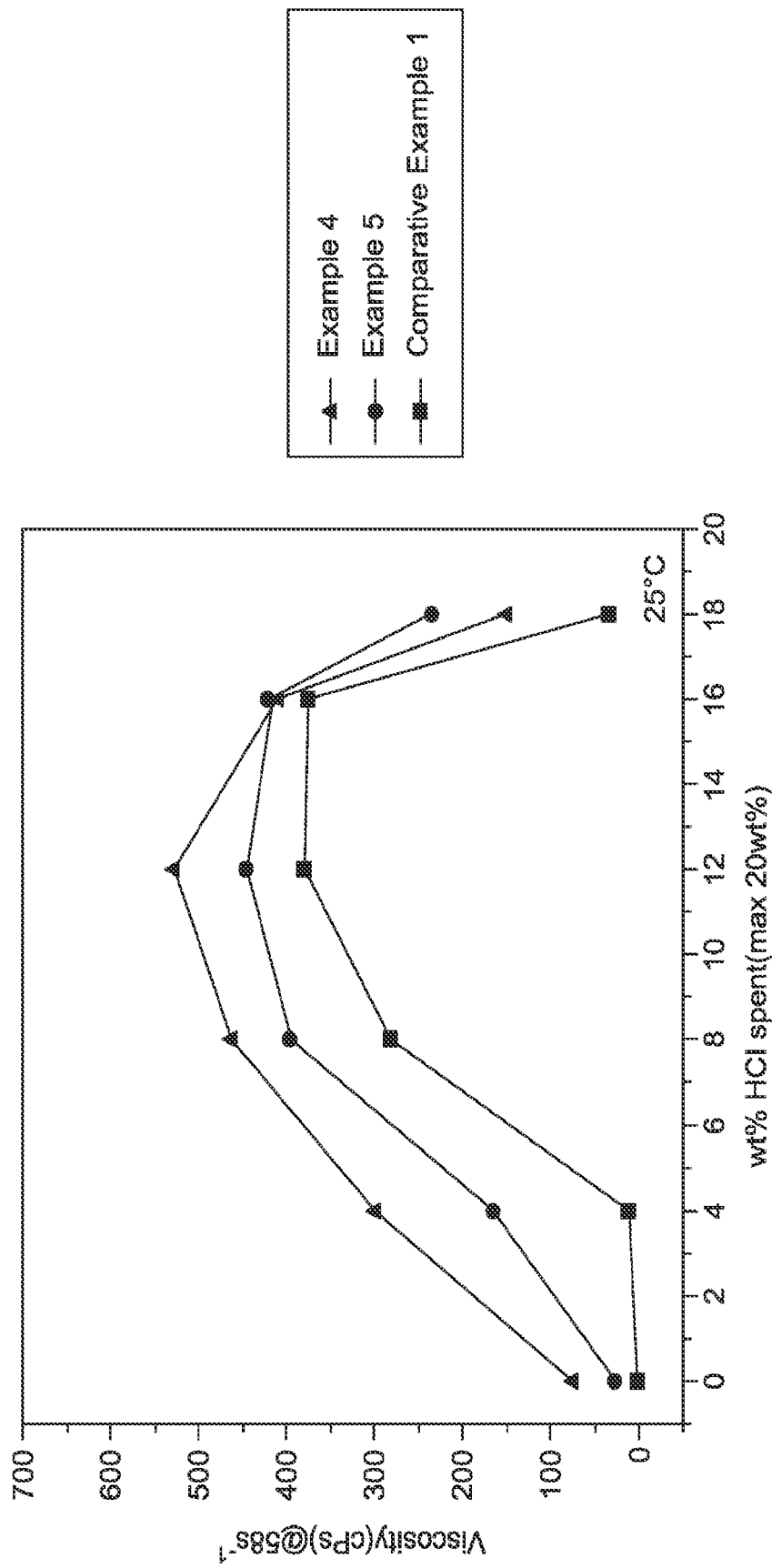

Figure 4

HCl spending test at high temperature (a)

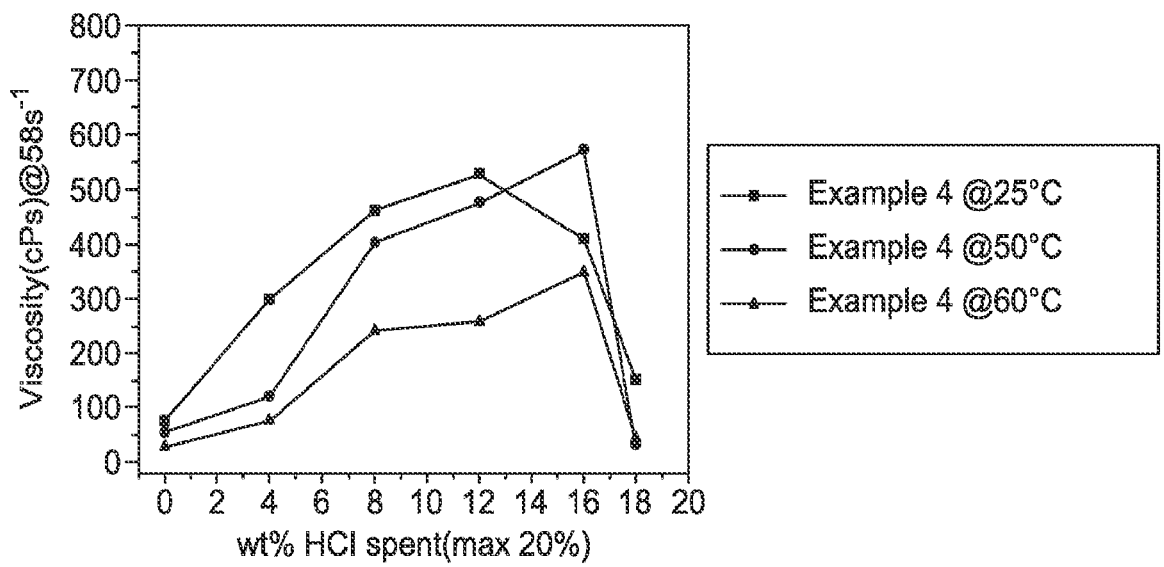

(b)

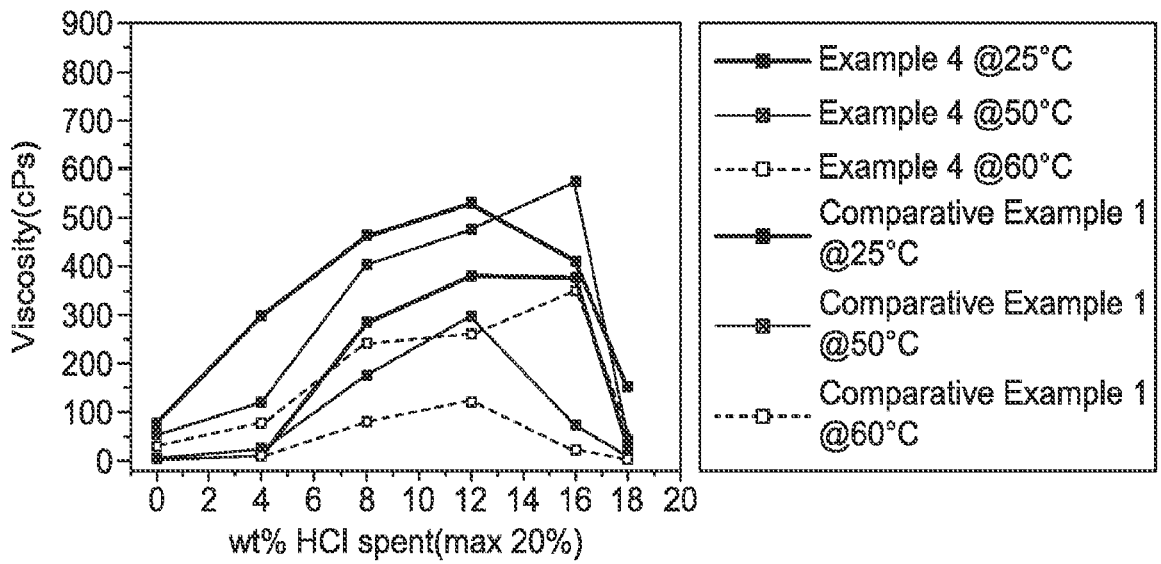

With the increase of temperature from 25°C to 60°C, the viscosity decreased from around 500cPs to around 200cPs. Compared to the CTBA system without any additive, the VES with 0.5% Celluforce CNC demonstrated an increase in viscosity in all temperature. This indicated the CNC could help the VES remain high viscosity at higher temperature.

Figure 5
Zwitterionic VES candidate
Zwitterionic Surfactant
Lauryl Sulfobetaine (SB3-12) from Alfa Chemistry
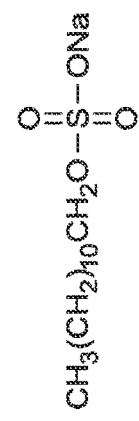
Stearyl Sulfobetaine (SB3-18) from Sigma-Aldrich
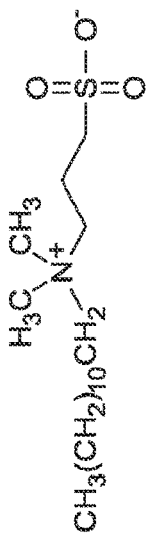
Counterion Compound
Sodium Dodecyl Sulfate (SDS) from Sigma-Aldrich
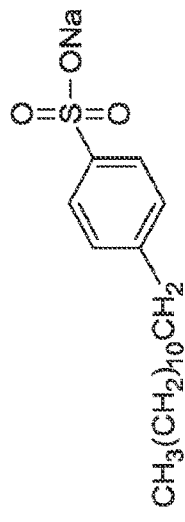
Sodium Dodecyl Benzene Sulfonate (SDBS) from Sigma-Aldrich
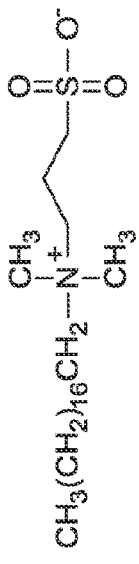

Figure 6
Study of Zwitterionic/Anionic VES system
(a)
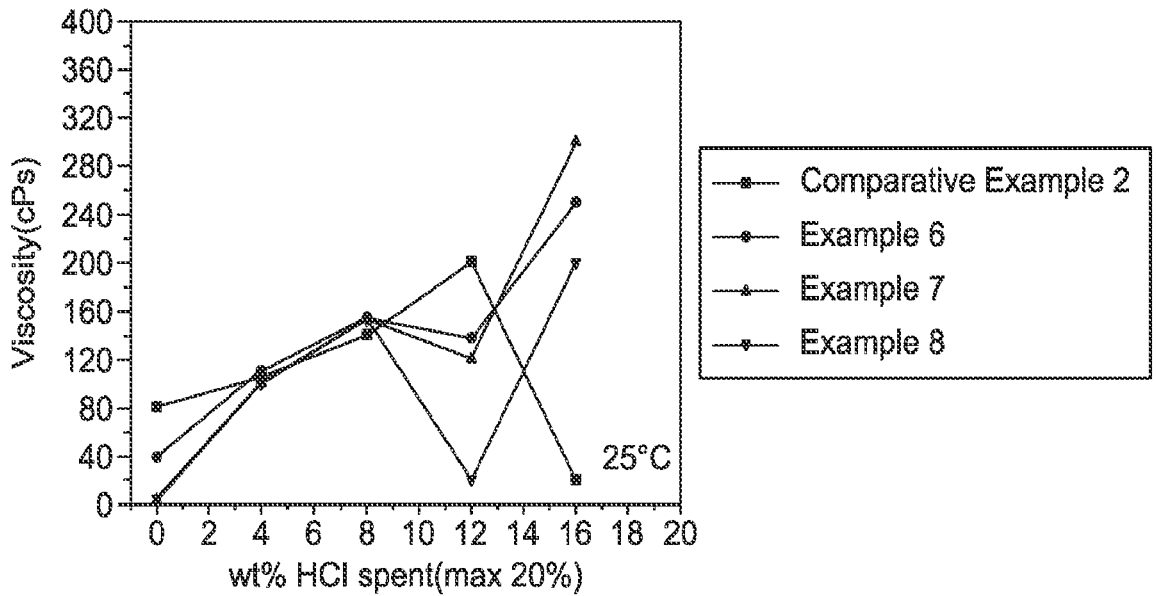
(b)
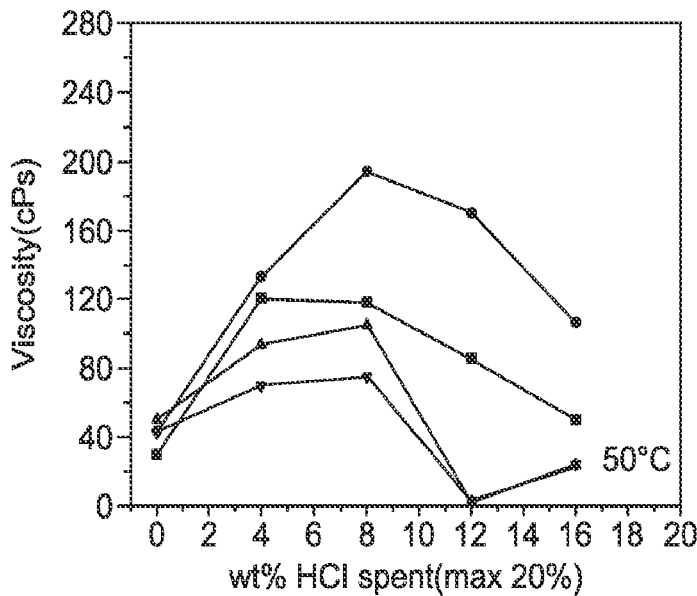
At room temperature, adding CNC and BYK clay influence the self-diverting property negatively. After spending of 16% of HCl, the viscosity increased instead of decreasing. At high temperature, the CNC helped to increase the viscosity of the VES.

Figure 7
Formulation study of CTAB VES in Acid Spending
(a)
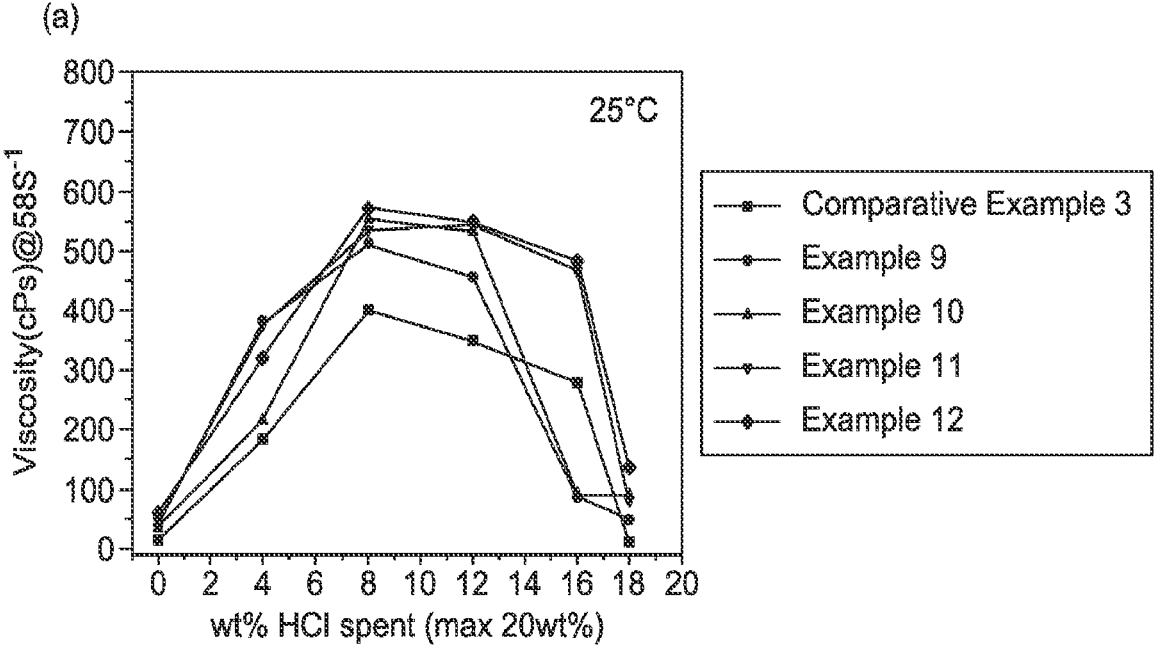
(b)
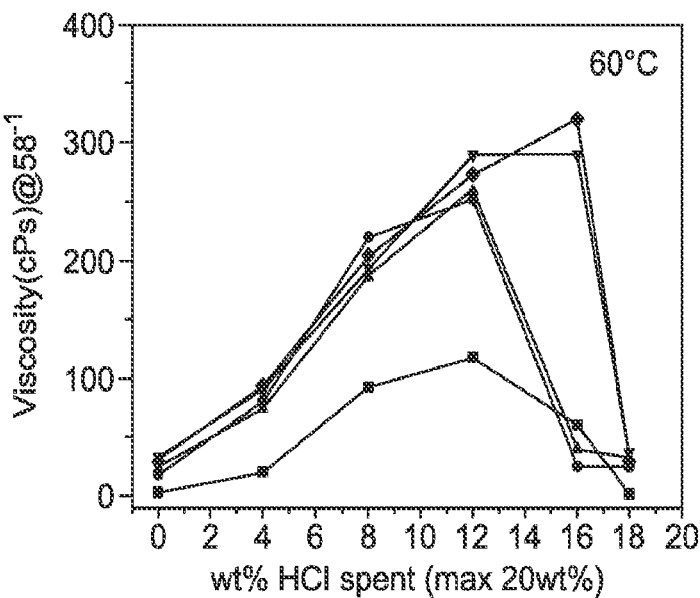

Figure 9
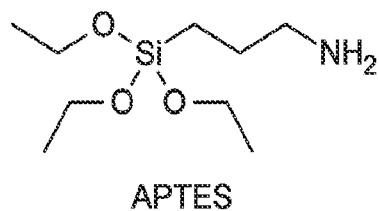
APTES
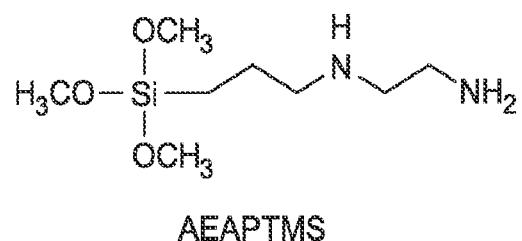
AEAPTMS
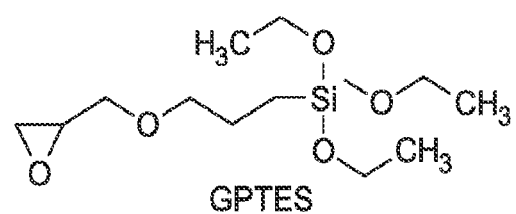
GPTES
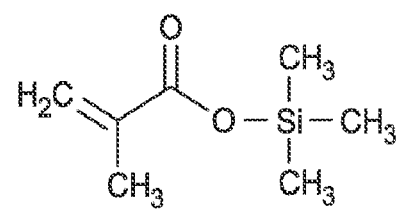
MATMS

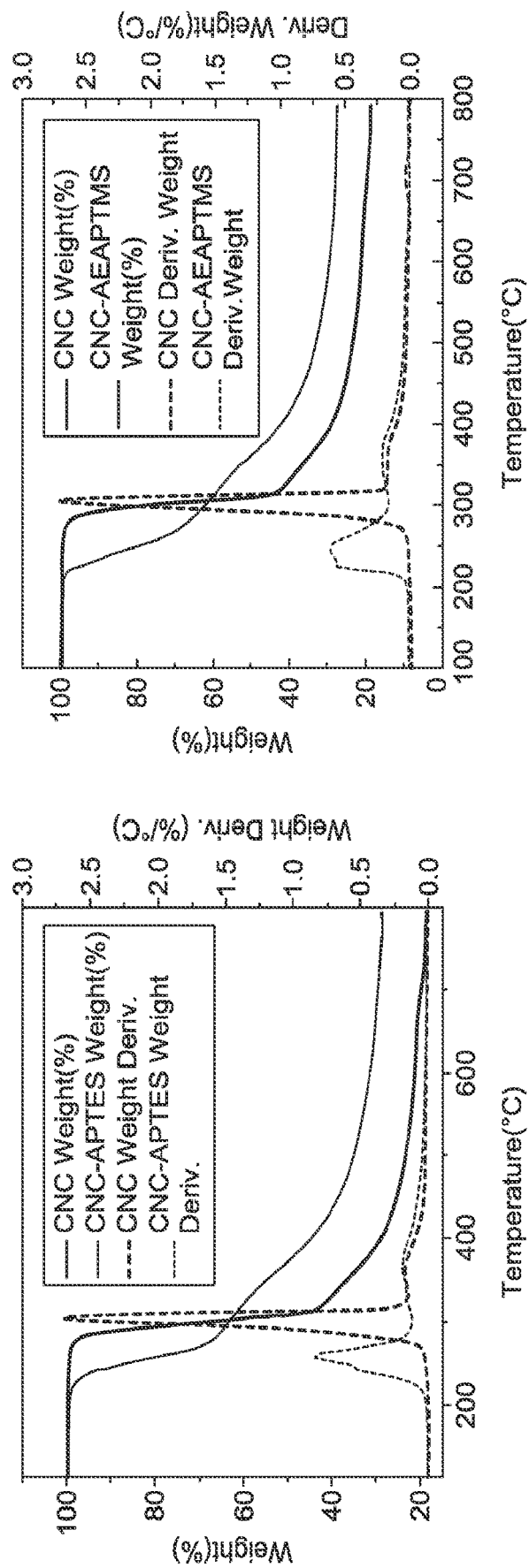

Figure 10

Synthesis of silane functionalized CNC

Interestingly, the TGA result demonstrated significant difference of between the unmodified and modified CNC by APTES and AEAPTMS. According to the result, without modification, the unmodified CNC demonstrated a degradation temperature at 305°C while the CNC-APTES and CNC-AEAPTMS demonstrated the degradation temperature at 256°C. This may imply the functionalization step may impact the thermal stability of the CNC FTIR spectra demonstrated the presence of C-N stretching for quaternary amine at 1480 cm$^{-1}$, which demonstrated that the functionalization is successful.
TGA results demonstrated that the cationic CNC has less thermal stability, which may caused by reducing the crystallinity and partial degradation during desulfation.

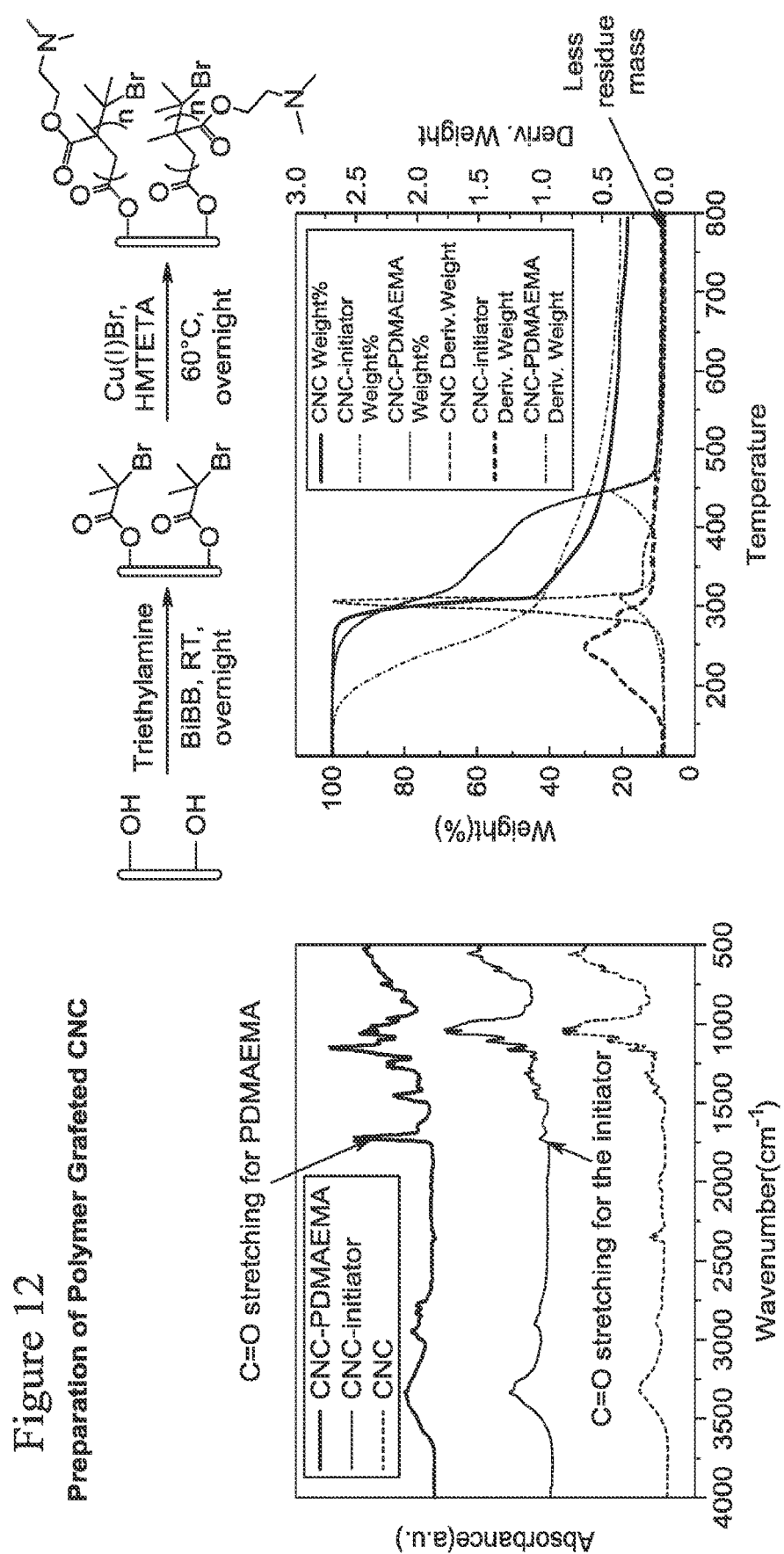

Figure 12
Preparation of Polymer Grafted CNC

FTIR spectra demonstrated the successful functionalization of ATRP-initiator and polymerization of PDMAEMA by detecting C=O stretching.
With only ATRP-initiator, the CNC is less thermal stable(161°C). After polymerization, the degradation temperature is increased to 231°C. Besides, CNC-PDMAEMA has less residue mass, which also supported the successful polymerization of PDMAEMA.

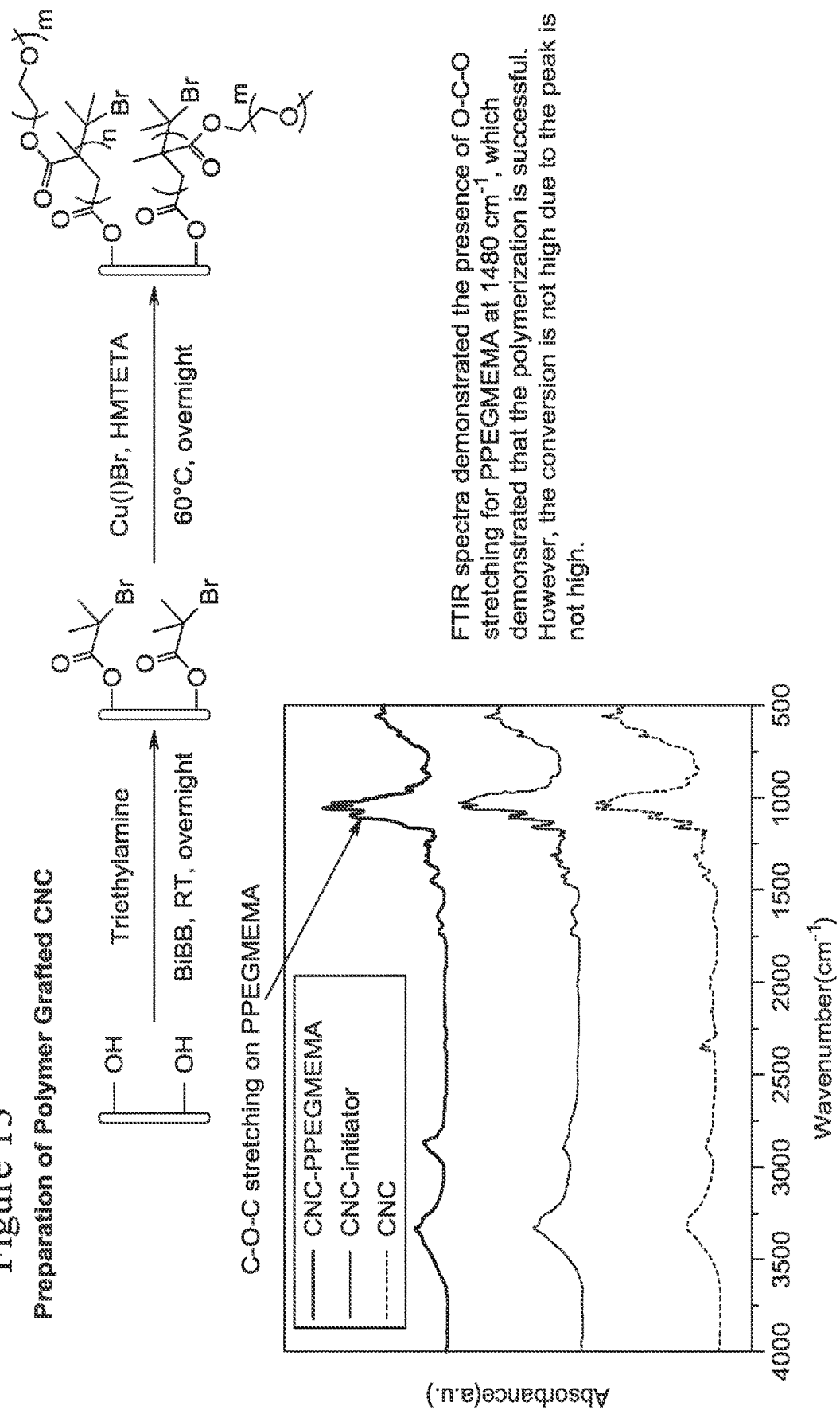

Study of CNC and polyelectrolyte as co-additive

Study of CNC and polymer as co-additive.

Figure 18
Study of CNC and polymer as co-additive
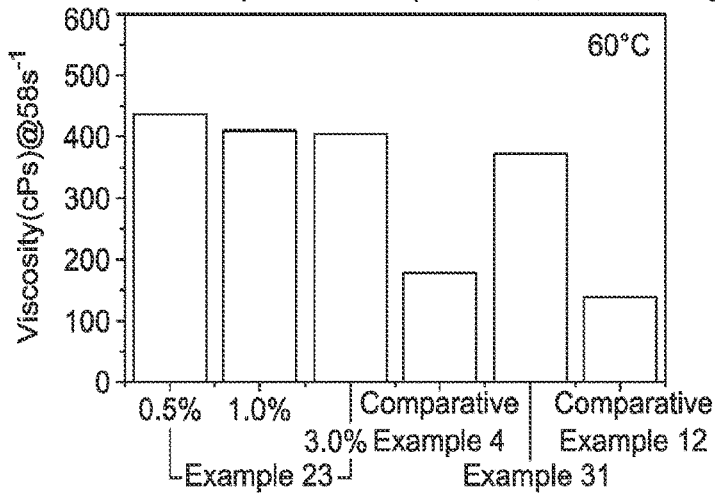
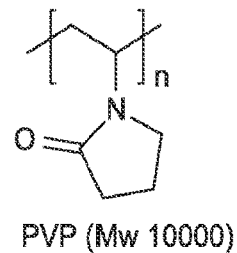
PVP (Mw 10000)
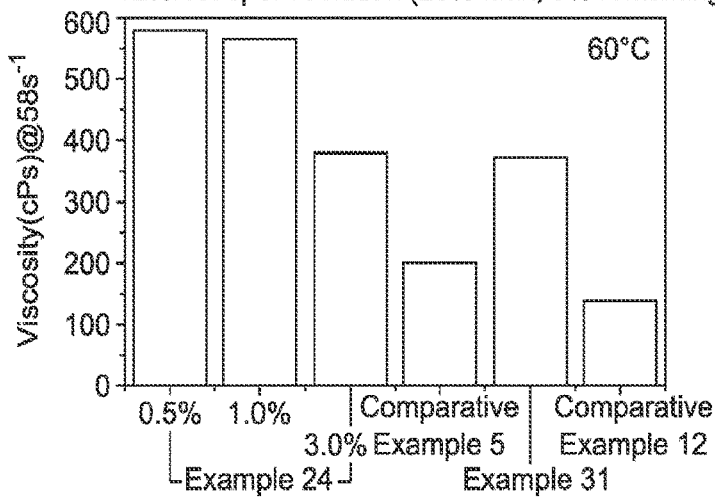
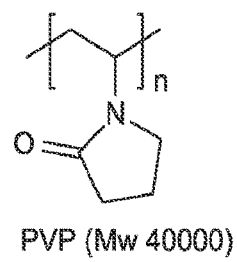
PVP (Mw 40000)
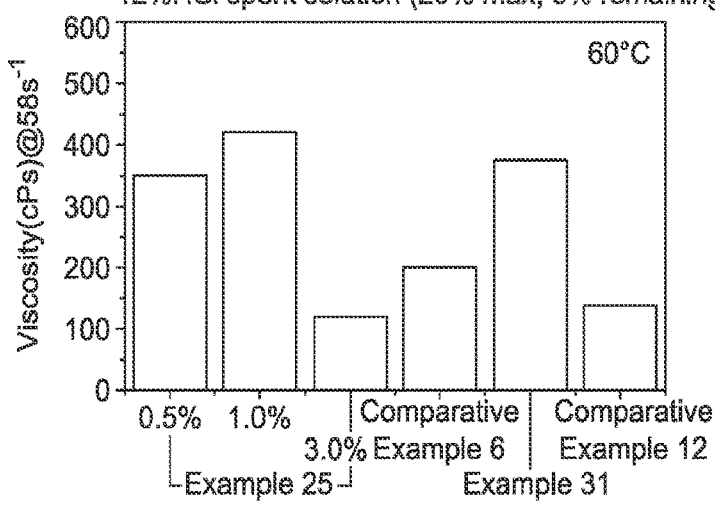
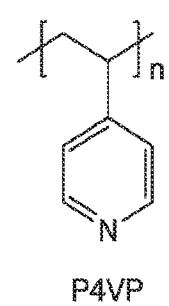
P4VP

ACID MATRIX APPLICATIONS: WELL STIMULATION AND COMPLETION FLUIDS USING VISCOELASTIC SURFACTANTS AND MODIFIED ADDITIVES

CROSS-REFERENCE TO RELATED APPLICATIONS

This application is a national stage application of International Application No. PCT/US2020/054584, filed Oct. 7, 2020, which is based upon and claims the benefit of priority to U.S. Provisional Application No. 62/911,671, filed Oct. 7, 2019. The entire contents of these applications are incorporated herein by reference.

TECHNICAL FIELD

The present invention relates to a composition for an oil or gas well formation and a producing method of the composition, and a forming method of the oil or gas well.

BACKGROUND ART

Viscoelastic surfactants (VES) as part of fracturing fluids and proppant transport fluids compositions during a fracture treatment is a departure from the use of polymer viscosifiers: namely gels based on polymers like natural guar and synthetic polyacrylamides. Viscosity of a VES fluid is created by self-assembly of surfactant small molecules in solution to create spherical, rod shaped and bicontinuous structures of lyotropic liquid crystalline order micelles. Entanglement of these flexible and higher order micelles imparts increased viscosity to the solution. Hydraulic fracturing (HF) has been used for many years for completion phase in drilling and a variety of stimulation fluids have been developed over the years that can withstand high pump rates, shear stresses, and high temperatures and pressures in the bore hole. In a completion stage in drilling (exploration and production), retained permeability and leak-off (fluid loss) control are two of the most important requirements. The main goal eventually is to achieve high conductivity pathways, which do not damage or lower the productivity of completed wells.

Cross-linked polymer gels are the most predominant viscosifying media in a number of oilfield fluid compositions providing good leak-off control. However, they are disadvantageous in retained permeability if all the polymers introduced are not degraded and can have poor fluid loss performance. VES as HF fluids have been reported in a number of patents (Patents 1-10, end of document). Since they are polymer free compositions and viscosity is mainly achieved by control of concentrations towards higher order micelle structures, they can be easily recovered and do not require a gel breaker for control. In addition, they can minimize fracture height growth and increase effective fracture length—in achieving effective productivity from well completion operations. With VES fluids, elasticity and micellar structure rather than the viscosity of fluid are the main property drivers. An important advantage is that VES fluids can efficiently do stimulation at lower viscosities with reduced friction pressure and thus reduce the energy for pumping fluids downhole towards greater fracture lengths (horizontal), enable better fracture geometry control, and with deeper formations. Other possible uses of VES technology includes filter cake removal, selective matrix diversion, permeability preservation, and coiled tubing clean out. Yet. VES has some disadvantages: 1) Poor stability at high concentrations and temperatures, 2) poor stability with complex brine conditions or highly salt saturated environments, 3) lack of viscosity-elastic control once deployed with other chemical components and additives, and 4) cost. A typical preferable volume for stimulation and completion operation using viscosifying polymer such as guar, xanthan gum, polyacrylamide is about 2-3% of the volume of water. The preferable volume for VES is about 3-10% of the volume of water. In general, the cost of a VES viscosifier can be up to 3× that of a polymer viscosifier. It is important to justify any price differential with advantages in thermal stability, brine stability, pressure control, pumping rate control, non-use of breakers, easy clean-up, stimuli-responsive behavior, and controlled release of actives, etc.

A number of surfactant types and architectures can be used for formulating VES fluids, including anionic, cationic, and zwitterionic surfactants (Literature 1-11, see end of document). It is preferable to create stable micelles with high-temperature and brine chemistry stability. A surfactant composition that creates useful rheology within concentrations ranging from 3% to 8% can be deemed cost-effective for demanding applications. The exact surfactant concentration often depends on the bottom hole temperature and desired fluid viscosity. In addition, a VES fluid can break to water-like Newtonian viscosity by exposure to liquid hydrocarbons or dilution with reservoir brines. Fine control of viscosity can further be achieved with a "breaker" introduced rationally for control at certain stages of a well-completion operation. The effectivity of the VES and a breaker control can be measured via conductivity tests and monitoring the retained permeability. This can be extended towards monitoring the effect on fracture propagation length, well connectivity, formation preservation, and can also be augmented in the field with tracer analysis. Another important property monitored with VES and well-completion operation is the fluid loss property. By pressurizing the fluid flow to a controlled permeability formation (simulated in the lab with a core flooding experiment), the cumulative fluid volume flowing into the core can be measured as a function of time and obtain the total fluid loss coefficient vs. permeabilities.

Other than HF applications, VES for well stimulation and completion applications are also important. The availability of various VES fluid systems is an advantage for working with different formation characteristics, base lithology, mineral compositions, formation fluids (brine chemistry) and operations (e.g. different pumping configurations). Tight gas wells, unconventional wells, shale, coal beds, and wells which have adverse capillary effects including sub-irreducible water saturation and hydrocarbon saturation necessitates oilfield chemicals that are optimized for a specific well condition. The low productivity of both old and new wells can be boosted by stimulation and completion procedures, e.g. acid stimulation and the use of diverters. Herein. VES stimulation fluids can have advantages: 1) employment of complementing surfactant systems, 2) benign to formation (no polymer residue or formation damage), 3) lower surface tension, 4) does not require biocides or clay control agents, 5) insensitive to salinity, and 6) the flowback fluid can be reused.

Acid stimulation is preferable for carbonate reservoirs (calcite and dolomite) to optimize productivity. When the productivity decreases as a result of formation damage or low natural permeability, acid well stimulation can increase productivity by creating more conductive flow paths between the reservoir and the borehole. Stimulation methods in carbonate sequences are classified into two main groups: matrix treatments and acid fracturing treatments. Matrix stimulation using VES fluids involves pumping acids, solvents, or other treatment chemicals into the formation at less than the reservoir fracture pressure. When acids are introduced into a carbonate formation, some of the minerals in the rock dissolve, which creates intricate, high-permeability channels or wormholes. Matrix treatments are often applied in zones with good natural permeability to counteract damage in the near-wellbore area. Acid fracturing stimulations, in contrast, are performed above the fracture pressure of the formation. A viscous pad (a fracturing fluid that does not contain proppant) is pumped into the formation at pressures above the fracture-initiation pressure, which fractures the rock. Then an acid stage is pumped to etch the fracture surfaces. The acid also creates conductive wormholes at or near the fracture surfaces. After stimulation, the fracture closes, but the increased conductivity between the formation and the well remains because of the etching and the creation of wormholes. In carbonate reservoirs, hydrochloric acid (HCl) is the most commonly applied stimulation fluid. Organic acids such as formic or acetic acid are used, mainly in retarded-acid systems or in high-temperature applications, to acidize either sandstones or carbonates.

Diversion is a technique used in injection treatments, such as matrix stimulation, to ensure uniform distribution of the treatment fluid across the treatment interval. Injected fluids tend to follow the path of least resistance, and this may lead to inadequate treatment of the least permeable areas within the stimulation interval.

Using diversion methods it is possible to focus treatment on the areas that require more stimulation. To be effective, the diversion effect should be temporary to enable the full productivity of the well to be restored when the treatment is completed. There are two main categories of diversion: mechanical and chemical. Focusing on the use of chemical diversion; while polymer based fluids have been used, there is a high interest on VES based diversion fluids due to its advantages in friction reduction and prevention of formation damage. In extended-reach wells, coiled tubing (CT) can be used to deliver the treatment to the reservoir. The treatment can be made up of the VES fluid composition (3-10%) and in 20-28% HCl with a corrosion inhibitor.

There have been previously reported prior art and patents for VES in general and they include:
1. Principles of VES fluids formation: wormlike micelles at higher concentrations.
2. Investigative methods for VES fluids.
3. Stimuli-responsive properties of VES fluids.
4. Stability of VES Fluids.
5. Different materials classes of VES fluids.

Patents Related to oilfield chemical applications:
1. Hydraulic Fracturing Fluids
2. Completion Fluids
3. Stimulation Fluids
4. IOR
5. enhanced oil recovery (EOR)

The patents by Schlumberger, Halliburton, Baker Hughes, BJ Services are predominant.

Reports on highly stable VES Fluids with acid matrix or media DOES NOT contain much by way of particle, nanoparticle additives, nanocellulose ingredients.

There are no reports on the use of modified nanoparticles and nanomaterials for VES fluids in oilfield stimulation and matrix acid treatments.

There is potential for reporting enhanced properties including stimuli-responsive properties of VES fluids and other actions of Self-diverting, controlled pH change, controlled dissolution, and higher temperature performance.

These Patents. Applications. and Publications that may be studied include the following:
U.S. Pat. No. 7,992,640 B2
August 2011
By Tianping Huang (Baker Hughes Inc.)
ORGANIC ACID TREATING FLUIDS WITH VISCOELASTIC SURFACTANTS AND INTERNAL BREAKERS
U.S. Pat. No. 7,303,019 B2
December 2007
By Thomas Welton (Halliburton Energy Services)
VISCOELASTIC SURFACTANT FLUIDS AND ASSOCIATED DIVERTING METHODS
U.S. Pat. No. 7,159,659 B2
January 2007
By Thomas Welton (Halliburton Energy Services)
VISCOELASTIC SURFACTANT FLUIDS AMD ASSOCIATED ACIDIZING METHODS
U.S. Pat. No. 7,159,659 B2
October 2006
By QI Qu (BJ Services)
ACID DIVERTING SYSTEM CONTAINING QUATERNARY AMINE
US Patent Application No.: US 2005/0126786A1
June 2005
By Diankui Fu (Schlumberger Technology Corporation)
VISCOELASTIC ACID
US Patent Application No.: US 2010/0331223 A1
December 2010
By Leiming Li (Schlumberger Technology Corporation)
ACID VISCOSITY ENHANCER FOR VISCOELASTIC SURFACTANTS
US Patent Appl.: US US 2014/0246198A1
September 2014
By Nisha Pandya (Halliburton Energy Services)
BRANCHED VISCOELASTIC SURFACTANT FOR HIGH TEMPERATURE ACIDIZING
US Patent Appl.: US 2011/0152135 A1
June 2011
By Yiyan Chen (Schlumberger)
VISCOELASTIC SURFACTANT ACID TREATMENT
US Patent Appl.: US 2006/0118302 A1
June 2006
By Michael Fuller (Schlumberger)
SELF DIVERTING MATRIX ACID
US Patent Appl.: US 2013/0274.149 A1
October 2013
By Valerie Lafitte (Schlumberger)
FLUIDS AM) METHODS INCLUDING NANOCELLULOSE
Accompanying Patents and Applications
US Patent No.: US 2015/0072902 A1
March 2015
By Thomas Welton (Schlumberger Technology Corporation)
FLUIDS AND METHODS INCLUDING NANOCELLULOSE

SUMMARY OF INVENTION

Technical Problem

1. New Formulations

To develop a new Viscoelastic Surfactant (VES) formulation with nanostructured complexes as viscosifying additives for completion and stimulation fluid applications and investigate their effectiveness. This includes modification of the VES formulation with any of the following: a) nanomaterial complexes, b) polymeric surfactant complexes, c) viscosifying polymer, and d) modified polymer and nanomaterial additives. This action will result in: a) stimuli-responsive properties or control. b) better stability at higher T and brine concentrations, and c) cost-effectiveness and performance.

2. Optimization of Formulation

To determine the best properties of these new VES compositions (nanomaterials and polymer complexes) in terms of structure-composition-property relationships-physico-chemical characterization and standardized testing methods should be performed. This involves the characterization of the formulation stability, viscosity measurements, rheology, high T rheology, as against various concentrations—to result in demonstrating cost-effective or low cost/high performance ratio advantages. Differentiation from existing VES formulations should be observed in superior properties and added functionality. Other additives resulting in enhanced and additional function may include: scale inhibitors, biocides, corrosion inhibitors, traces, fluid loss agents, formation stabilizers, stimuli-response properties. The use of cellulose nanocrystals (CNC) also called nanocellulose as an additive is of high interest, particularly because of its renewability and sustainability. The ability of nanocellulose materials to complex with VES fluids will be of high interest in augmenting the stability of the worm-like micelles and differentiation between other nanofiber interactions. For example, CNC and nanofibers can influence shear rate properties and stability with VES at higher temperature.

3. Acid Stimulation Formulation

To develop a new VES and nanostructured complexes as viscosifying media for acid stimulation, acid fracturing, and diversion applications. This differentiation from existing and reported VES formulations under highly acidic condition is done by incorporating: a) polyelectrolyte complexes, b) polymeric surfactant complexes, and c) nanomaterial additives that will result in: a) stimuli-responsive properties (such as self-diverting properties), b) higher stability at high T and brine concentrations, and c) cost-effectiveness and performance. While common surfactants are used, the importance of investigating cationic, anionic, and zwitterionic group against various counterions are important. The addition of nanomaterial s and polymers can further improve these formulation performance. The application of surface modification by various silanes (sulfonate, carbonate, epoxy, amine, etc.) and polymer grafting by surface initiated polymerization (SIP) will be new. The demonstration includes determining the use of various organic counterions to the surfactants suitable for acid conditions and testing on analogous calcite/dolomite mineral type dissolution is included. Specifications on viscosity, viscoelastic behavior. T and P stability, pH stability, brine stability will be determined.

4. Further Optimization of Formulation with Synergistic Additives

To investigate the optimized properties of these new VES complexes (polymer and nanoparticles) further in terms of structure-composition-property relationships for acid stimu-lation, fracturing, and diversion, additives against corrosion, scaling, fluid loss prevention, etc. can be added. This will involve physico-chemical characterization and standardized testing methods—with other additives resulting in enhanced and additional function which include: scale inhibitors, biocides, corrosion inhibitors, traces, fluid loss agents, formation stabilizers, stimuli-response properties.

Solution to Problem

The present inventors have diligently studied to solve the above problems, and as a result, have found that the above problems can be solved by combining a viscoelastic surfactant with a modified nanomaterial, and thereby completed the present invention.

More specifically, the present invention is as follows.

1. A composition for an oil or gas well formation, comprising:
 a viscoelastic surfactant; and
 a modified nanomaterial.
2. The composition according to item 1,
 wherein the modified nanomaterial comprises a nanocellulose.
3. The composition according to item 1 or 2,
 wherein the modified nanomaterial has, on its surface, at least one selected from the group consisting of a sulfate group, a sulfite group, a carboxy group, an ethylene oxide chain, an amino group, an ester group, a silane group and a tertiary ammonium group.
4. The composition according to item 3,
 wherein the modified nanomaterial has the sulfate group on its surface.
5. The composition according to any one of items 1 to 4,
 wherein the modified nanomaterial has a grafted polymer on its surface.
6. The composition according to any one of items 1 to 5, further comprising:
 a counterion compound which has a counterion portion against to an ionic group of the viscoelastic surfactant.
7. The composition according to item 6,
 wherein the counterion compound comprises an organic acid salt.
8. The composition according to item 6 or 7,
 wherein the counterion compound comprises at least a carboxylic acid salt or a sulfonic acid salt.
9. The composition according to any one of items 6 to 8,
 wherein the viscoelastic surfactant comprises at least one selected from the group consisting of a cationic surfactant, an anionic surfactant, a zwitterionic surfactant and amphoteric surfactant.
10. The composition according to any one of items 6 to 9,
 wherein the viscoelastic surfactant comprises a compound represented by formula (1):

$$R^1\text{—}N(R^2)_3{}^+X^- \qquad (1)$$

wherein, $R^1$ is an aliphatic group having 10 to 20 carbon atoms, $R^2$ is an aliphatic group having 1 to 6 carbon atoms and $X^-$ is a negative ion.
11. The composition according to any one of items 1 to 10, further comprising a polymer and/or an additive.
12. The composition according to item 11,
 wherein the polymer comprises at least one selected from the group consisting of polyacrylamide, poly(allylamine hydrochloride), poly(ethylene glycol) polyethyleneimine polyvinyl alcohol, poly(4-styrenesulfonic acid-co-maleic acid), polyvinylpyrrolidone, polyallylamine, and poly(diallyl dimethyl ammonium), polyaniline, poly (4-vinylpyridine), polyaniline emeraldine.

13. The composition according to item 1 further comprising a solvent.

14. A method of producing a composition, comprising:
a step of mixing a modified nanomaterial and a viscoelastic surfactant.

15. A method of forming an oil or gas well, comprising:
a step of preparing a fluid comprising:
a solvent;
a viscoelastic surfactant;
a modified nanomaterial; and
an acid material, and
a step of introducing the fluid into the well.

Advantageous Effects of Invention

According to the present invention, a composition, for an oil or gas well formation, excellent in stability and self-diverting acid property, and a producing method of the composition, and a forming method of the oil or gas well can be provided.

BRIEF DESCRIPTION OF DRAWING

FIG. 3 shows HCl spending test in comparing between Examples 4 to 5 and Comparative Example 1, and appearance of samples.

FIG. 4 shows HCl spending test in comparing between Example 4 and Comparative Examples 1.

FIG. 5 shows viscoelastic surfactant candidates.

FIG. 6 shows HCl spending test in comparing between Examples 6 to 8 and Comparative Example 2.

FIG. 7 shows HCl spending test in comparing between Examples 9 to 11 and Comparative Example 3.

FIG. 9 shows modifying agent candidates.

FIG. 10 shows TGA result of CNC-APTES and CNC-AEAPTMS.

FIG. 12 shows FTIR and TGA result of PDMEAMA grafted CNC.

FIG. 13 shows FTIR of polymer grafted PPEGMEMA grafted CNC.

FIG. 18 shows HCl spending test in comparing in comparing between Examples 23 to 25 and 31, and Comparative Examples 4 to 6 and 12.

DECRYPTION OF EMBODIMENTS

Figure 1:
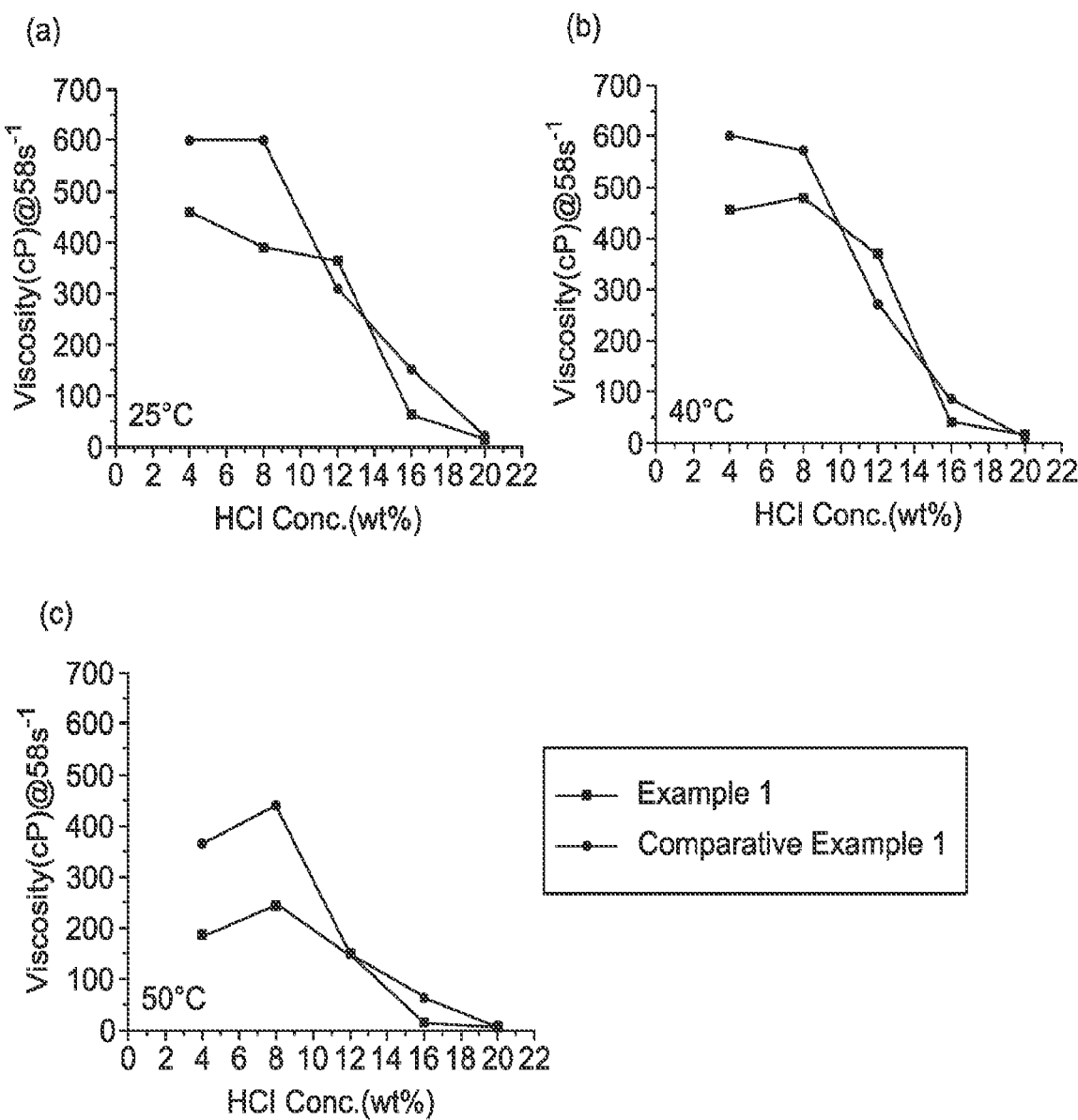
FIG. 1 shows acid sensitivity of viscoelastic surfactant in comparing between Example 1 and Comparative Example 1.

Hereinafter, embodiments of the present invention (hereinafter, also referred to as the "this embodiment") will be described in detail. The embodiments described below are given merely for illustrating the present invention. The present invention is not limited only by these embodiments.

1. Composition for an Oil or Pas Well Formation

A composition for an oil or gas well formation, in this embodiment, comprises a viscoelastic surfactant and a modified nanomaterial. The composition is excellent in self-diverting acid property and stability.

As described in Example section, a viscosity of the composition is change based on acid concentration or pH. The viscosity of the composition may be controlled by supplying acid or consuming acid. The term "self-diverting acid property" in this disclosure means the property changing the viscosity based on acid (see also FIGS. 5 and 6 etc. . . . ). Especially, for an oil or gas well formation, the change rate of the viscosity is preferably large.

As described in Example section, it is preferable that the self-diverting acid property is keep in various pH or temperature. Especially, for an oil or gas well formation, the composition is exposed to various pH or temperature. The term "stability" in this disclosure means that the self-diverting acid property is keep in various pH or temperature.

1.1. Viscoelastic Surfactant

Examples of the viscoelastic surfactant include, but not particularly limited to, at least one selected from the group consisting of a cationic surfactant, an anionic surfactant, a zwitterionic surfactant, and an amphoteric surfactant. The viscoelastic surfactant comprises an ionic group. The viscoelastic surfactant may be used singly, or may be used in combination of two or more thereof.

Examples of such ionic group include, but not particularly limited to, a positive charge group such as ammonium group, and a negative charge group such as carboxylic acid, sulfonic acid, sulfate, phosphonate. Among them, ammonium group, carboxylic acid, and sulfonic acid are preferred, at least one selected from the group consisting of carboxylic acid and sulfonic acid is more preferred. By using such viscoelastic surfactant, the self-diverting acid property and the stability tends to improve.

1.1.1. Cationic Surfactant

A cationic surfactant has a positively charged group. Examples of such cationic surfactant, but not particularly limited to, alkylamine, alkyldiamine, alkyletheramine, alkylquaternary ammonium, dialkyl quaternary ammonium, and alkyl ester quaternary ammonium.

Some of such cationic surfactant may be represented, but not particularly limited to, by following formula (1):

$$R^1\text{—}N^+(R^2)_3 X^-  \quad (1)$$

wherein, $R^1$ represents alkyl, alkenyl, cycloalkyl, arylalkyl, alkylaryl, alkylarylalkyl, alkyletheralkyl, alkylaminoalkyl, alkylamidoalkyl, or alkylesteralkyl, $R^2$ each independently represents alkyl, alkenyl, cycloalkyl, $X^-$ is a negative ion.

The number of carbon atoms in the group represented by $R^1$ is preferably 8 to 30, 10 to 20. $R^1$ may be linear, branched, or cyclic structure. Among them, $R^1$ preferably represents aliphatic group, such as alkyl, alkenyl, cycloalkyl, arylalkyl, alkylaryl, and alkylarylalkyl.

The number of carbon atoms in the group represented by $R^2$ is preferably 1 to 20, 1 to 6. $R^2$ may be linear, branched, or cyclic structure. Among them, $R^2$ preferably represents aliphatic group, such as alkyl.

The negative ion represented by $X^1$ is as describe above. Among them, the organic anion and the halogen ion is preferred, the halogen ion is more preferred.

Among them, cetyl trimethyl ammonium bromide (CTAB) represented following formula is preferred.

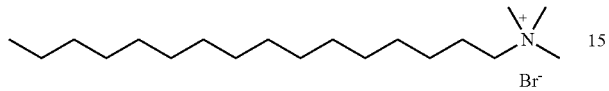

1.1.2. Anionic Surfactant

An anionic surfactant has a negatively charged group. Examples of such anionic surfactant, but not particularly limited to, alkyl carboxylates, alkyl ether carboxylates, alkyl sulphates, alkyl ether sulphates, alkyl sulfonate, alkyl ether sulfonate, alkyl sulfate, alkyl ether sulfate, alkyl phosphates and alkyl ether phosphates.

Some of such anionic surfactant may be represented, but not particularly limited to, by following formula (2):

$$R\text{—}Z \quad (2)$$

wherein, R represents alkyl, alkenyl, cycloalkyl, arylalkyl, alkylaryl, alkylarylalkyl, alkyletheralkyl, alkylaminoalkyl, alkylamidoalkyl, or alkylesteralkyl, Z represents negatively charged group.

The number of carbon atoms in the group represented by R is preferably 8 to 30, 10 to 20. $R^1$ may be linear, branched, or cyclic structure. Among them, R preferably represents aliphatic group, such as alkyl, alkenyl, cycloalkyl, arylalkyl, alkylaryl, and alkylarylalkyl.

Z represents the negatively charged hydrophilic head of the surfactant. Examples of the negatively charged group represented by Z include, but not particularly limited to, carboxylate $COO^-$, sulfonate $SO_3^-$, sulfate $SO_4^-$, phosphonate, phosphate, and combinations thereof.

1.1.3. Zwitterionic Surfactant

Zwitterionic surfactant is associated with both negative and positive portions. Examples of such zwitterionic surfactant include, but not particularly limited to, alkyl betaine, alkylamidobetaine, alkyl amino oxide and alkylquaternary ammonium carboxylate.

Some of such zwitterionic surfactant may be represented, but not particularly limited to, by following formula (3).

$$R^1\text{—}N^+(R^2)_2R^3Z \quad (3)$$

wherein, R represents alkyl, alkenyl, cycloalkyl, arylalkyl, alkylaryl, alkylarylalkyl, alkyletheralkyl, alkylaminoalkyl, alkylamidoalkyl, or alkylesteralkyl. $R^2$ each independently represents alkyl, alkenyl, cycloalkyl, $R^3$ represents alkenyl, Z represents negatively charged group.

R, $R^2$, and Z are the same as describe above. The number of carbon atoms in the group represented by $R^3$ is preferably 1 to 20, 1 to 6. $R^3$ may be linear, branched, or cyclic structure. Among them, the following zwitterionic surfactants are preferred.

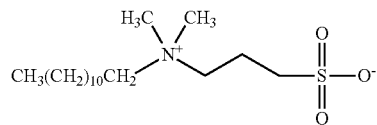

Lauryl Sulfobetaine (SB3-12) from Alfa Chemistry

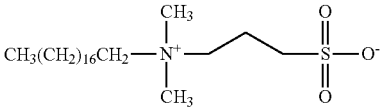

Stearyl Sulfobetaine (SB3-18) from Sigma-Aldrich

1.1.4. Amphoteric Surfactant

Amphoteric surfactant is both a positively charged moiety and a negatively charged moiety over a certain pH range. The amphoteric surfactant also has only a negatively charged moiety over a certain pH range (e.g. typically slightly alkaline) and only a positively charged moiety at a different pH (e.g. typically moderately acidic). Examples of such zwitterionic surfactant include, but not particularly limited to, a compound represented by following formula (4).

$$R^1\text{—}NH^+(R^2)R^3COO^- \quad (4)$$

wherein, $R^1$ is an aliphatic group having 10 to 20 carbon atoms, $R^2$ and $R^3$ is an aliphatic group having 1 to 6 carbon atoms.

1.1.5. Content of Viscoelastic Surfactant

The content of the viscoelastic surfactant is preferably 0.1 weight % or more, 0.5 weight % or more, 1.0 weight % or more, 1.5 weight % or more, 2.0 weight % or more. When the content of the viscoelastic surfactant is 0.1 weight % or more, the self-diverting acid property tends to improve.

The content of the viscoelastic surfactant is preferably 30 weight % or less, 20 weight % or less, 10 weight % or less, 7.5 weight % or less, 5.0 weight % or less, based on the total amount of the composition. When the content of the viscoelastic surfactant is 90 weight % or less, the stability tends to improve.

If viscoelastic surfactant is used in combination of two or more, the above content of the viscoelastic surfactant is total amount of them.

1.2. Counter Compound

The composition may further comprise a counterion compound which has a counterion portion against to an ionic group of the viscoelastic surfactant. When the viscoelastic surfactant is the cationic surfactant, the counterion compound means an anionic compound. In addition, when the viscoelastic surfactant is the anionic surfactant, the counterion compound means a cationic compound. Furthermore, when the viscoelastic surfactant is the zwitterionic surfactant or the amphoteric surfactant, the counterion compound means the cationic compound and/or the anionic compound.

Examples of such counterion compound include, but not particularly limited to, an inorganic counterion compound and an organic counterion compound. Among them, the organic counterion compound is preferred. By using such counterion compound, the self-diverting acid property and the stability tends to improve.

The inorganic counterion compound includes, but not particularly limited to, alkali metal inorganic salt such as sodium chloride, and potassium bromide; and alkaline earth metal inorganic salt such as calcium chloride.

The organic counterion compound includes, but not particularly limited to, aliphatic carboxylic acid; alicyclic carboxylic acid; aromatic carboxylic acid such as benzoates, salicylate, naphthalene carboxylate, naphthalene dicarboxylate; aliphatic sulfonic acid alicyclic sulfonic acid, aromatic sulfonic acid such as benzene sulfonate, alkylbenzene sulfonate naphthalene sulfonate; aliphatic alcohol; alicyclic alcohol; aromatic alcohol such as, phenol, naphthol; aliphatic amine; alicyclic amine; aromatic amine.

Among them, an organic acid, such as aromatic carboxylic acid and aromatic sulfonic acid, is preferred, sodium salicylate and sodium dodecyl benzene sulfonate is more preferred. By using such counterion compound, the self-diverting acid property and the stability tends to improve.

1.3. Modified Nanomaterial

The term "nanomaterials" as used in this disclosure, is intended to include any suitable known nanoscale material having a nano-scale size in at least one dimension. Examples of such the modified nanomaterial include, but not particularly limited to, nanocellulose, carbon nanotube, graphene, nanofiber, nanoclay such as silicate, particles such as silica nanoparticle, modified silica nanoparticles, titanium oxide nanoparticle. The modified nanomaterial may be used singly, or may be used in combination of two or more thereof. A shape of nanomaterials may be spherical, whisker, or fiber.

Among them, nanocellulose and nanoclay are preferred, nanocellulose is more preferred. Nanocellulose is also called cellulose nanofibers (CNF), microfibrillated cellulose (MFC) or cellulose nanocrystal (CNC). By using nanocellulose, the self-diverting acid property and the stability tends to improve.

The term "modified" or "functionalized" as used in this disclosure, means that the nanomaterials has an introduced functional group and/or a grafted polymer on its surface.

Examples of such the functional group include, but not particularly limited to, at least one selected from the group consisting of a sulfate group, a sulfite group, a carboxy group, an ethylene oxide chain, an amino group, an ester group, a silane group and a tertiary ammonium group.

Among them, ionic group is preferred, sulfate group, carboxy group, an amino group, and silane group are more preferred, sulfate group, carboxy group are further preferred, and sulfate group are more further preferred. By using nanocellulose having such group on its surface, the self-diverting acid property and the stability tends to improve.

Examples of such the grafted polymer include, but not particularly limited to, poly (meth)acrylic acid, poly(meth)acrylate methyl, poly(meth)acrylate ethyl, poly(meth)acrylate propyl, poly(meth)acrylate butyl, poly(meth) acrylate benzyl, poly(meth)acrylate cyclohexyl, poly(meth)acrylate 2-hydroxyethyl, poly(meth)acrylate 2-hydroxypropyl, poly (polyalkyleneglycol (meth)acrylate), poly(alkoxypolyalkyleneglycol (meth)acrylate), poly(diethylaminoethyl (meth) acrylate), poly(dimethylaminoethyl (meth) acrylate), polyacrylamide, N,N-dimethyl(metha)acrylamide, polyealkyleneglycol.

Among them, poly (poly(ethylene glycol) methyl ether methacrylate), poly (2-(dimethylamino)ethyl methacrylate) are preferred. By using nanocellulose having such grafted polymer on its surface, the self-diverting acid property and the stability tends to improve.

The content of the modified nanomaterial is preferably 0.01 weight % or more, 0.05 weight % or more, 0.1 weight % or more, 0.2 weight % or more, 0.3 weight % or more. When the content of the modified nanomaterial is 0.05 weight % or more, the self-diverting acid property tends to improve.

The content of the modified nanomaterial is preferably 20 weight % or less, 10 weight % or less, 5.0 weight % or less, 3.0 weight % or less, 2.0 weight % or less, based on the total amount of the composition. When the content of the modified nanomaterial is 20 weight % or less, the stability tends to improve.

The weight ratio of the viscoelastic surfactant to the modified nanomaterial is preferably 1.0 times or more, 2.0 times or more, 3.0 times or more, 4.0 times or more. When the weight ratio of the viscoelastic surfactant to the modified nanomaterial is 1.0 times or more, the self-diverting acid property tends to improve.

The weight ratio of the viscoelastic surfactant to the modified nanomaterial is preferably 20 times or less, 15 times or less, 10 times or less. When the weight ratio of the viscoelastic surfactant to the modified nanomaterial is 20 times or less, the stability tends to decrease.

1.4. Polymer

The composition may further comprise a polymer when needed. Examples of the polymer include, but not particularly limited to, at least one selected from the group consisting of polyacrylamide, poly(allylamine hydrochloride), poly(ethylene glycol) polyethyleneimine, polyvinyl alcohol, poly(4-styrenesulfonic acid-co-maleic acid), polyvinylpyrrolidone, polyallylamine, poly(diallyl dimethyl ammonium), polyaniline, poly (4-vinylpyridine), and polyaniline emeraldine. In addition, the polymer includes polyelectrolyte.

Among them, a polymer contain nitrogen atom is preferred. As such additive polymer, polyacrylamide, poly (allylamine hydrochloride), polyvinyl alcohol, poly(4-styrenesulfonic acid-co-maleic acid), polyvinylpyrrolidone, polyallylamine, poly(diallyl dimethyl ammonium), polyaniline, poly (4-vinylpyridine), and polyaniline emeraldine are more preferred. By using such polymer, the self-diverting acid property and the stability tends to improve.

The content of the polymer is preferably 0.1 weight % or more, 0.2 weight % or more, 0.3 weight % or more. When the content of the polymer is 0.5 weight % or more, the self-diverting acid property tends to improve.

The content of the polymer is preferably 10 weight % or less, 7.5 weight % or less, 5 weight % or less, based on the total amount of the composition. When the content of the polymer is 10 weight % or less, the stability tends to improve.

1.5. Additives

The composition may further comprise additives when needed. Examples of the additive include, but not particularly limited to, at least one selected from the group consisting of scale inhibitors, biocides, corrosion inhibitors, traces, fluid loss agents, formation stabilizers, stimuli-response agents. The additives may be used singly, or may be used in combination of two or more thereof.

1.6. Solvent

The composition may further comprise solvent when need. Examples of the solvent include, but not particularly limited to, water. The composition may include water as a brine.

The content of the solvent is preferably 30 weight % or more, 40 weight % or more, 50 weight % or more, 60 weight % or more, 70 weight % or more, 80 weight % or more, 90 weight % or more. The content of the solvent is preferably 97 weight % or less, 95 weight % or less, 90 weight % or less, 80 weight % or less, 70 weight % or less, 60 weight % or less, based on the total amount of the composition. When the content of the solvent is within the above range, the self-diverting acid property and the stability tends to improve.

1.7. Other Components

The composition may further comprise other components when need. Examples of such other component include, but not particularly limited to, acid material such as HCl, HF.

As the describe above, the viscosity of the composition is change based on acid concentration or pH. The viscosity of the composition may be controlled by supplying acid or consuming acid. Therefore, if the composition contain acid, the concentration of acid is not limited. In view of the self-diverting acid property and the stability, the concentration range of acid is preferable 0.1 to 40 weight %.

1.8. Viscoelastic Property

1.8.1 Acid Sensitivity of the Composition

The viscosity of the composition at specified temperature decrease with an increasing in acid concentration. A rate of a viscosity at 25° C. of the composition including 4 weight % acid to a viscosity at 25° C. of the composition including 20 weight % acid is preferably 25 to 50, 30 to 45, 30 to 40.

Preferable viscosity range at 25° C., 58 $S^{-1}$, for each acid concentration, of the composition is following A viscosity at 25° C. of the composition including 4 weight % acid is preferably 500 to 1000 cP, 525 to 900 cP, 550 to 800 cP.

A viscosity at 25° C. of the composition including 8 weight % acid is preferably 450 to 1000 cP, 475 to 900 cP, 500 to 800 cP.

A viscosity at 25° C. of the composition including 12 weight % acid is preferably 200 to 400 cP, 225 to 375 cP, 250 to 350 cP.

A viscosity at 25° C. of the composition including 16 weight % acid is preferably 50 to 250 cP, 75 to 225 cP, 100 to 200 cP.

A viscosity at 25° C. of the composition including 20 weight % acid is preferably 1 to 100 cP, 1 to 75 cP, 1 to 50 cP.

A rate of a viscosity at 40° C. of the composition including 4 weight % acid to a viscosity at 25° C. of the composition including 20 weight % acid is preferably 25 to 50, 30 to 45, 30 to 40.

Preferable viscosity range at 40° C., 58 $S^{-1}$, for each acid concentration, of the composition is following A viscosity at 40° C. of the composition including 4 weight % acid is preferably 500 to 1000 cP, 525 to 900 cP, 550 to 800 cP.

A viscosity at 40° C. of the composition including 8 weight % acid is preferably 450 to 1000 cP, 475 to 900 cP, 500 to 800 cP.

A viscosity at 40° C. of the composition including 12 weight % acid is preferably 200 to 400 cP, 225 to 375 cP, 250 to 350 cP.

A viscosity at 40° C. of the composition including 16 weight % acid is preferably 30 to 200 cP, 40 to 175 cP, 50 to 150 cP.

A viscosity at 40° C. of the composition including 20 weight % acid is preferably 1 to 100 cP, 1 to 75 cP, 1 to 50 cP.

A rate of a viscosity at 50° C. of the composition including 4 weight % acid to a viscosity at 25° C. of the composition including 20 weight % acid is preferably 25 to 50, 30 to 45, 30 to 40.

Preferable viscosity range at 50° C. 58 $S^{-1}$, for each acid concentration, of the composition is following A viscosity at 50° C. of the composition including 4 weight % acid is preferably 250 to 700 cP, 275 to 550 cP, 300 to 400 cP.

A viscosity at 50° C. of the composition including 8 weight % acid is preferably 250 to 700 cP, 275 to 550 cP, 300 to 500 cP.

A viscosity at 50° C. of the composition including 12 weight % acid is preferably 60 to 250 cP, 80 to 225 cP, 100 to 200 cP.

A viscosity at 50° C. of the composition including 16 weight % acid is preferably 30 to 200 cP, 40 to 175 cP, 50 to 150 cP.

A viscosity at 50° C. of the composition including 20 weight % acid is preferably 1 to 100 cP, 1 to 75 cP, 1 to 50 cP.

1.8.2. Acid Spending Test

The composition has the self-diverting acid property. The self-diverting acid property can be described acid spending test. When the acid is being spent by reaction with calcium carbonate or other reactive minerals, the viscosity of the composition increase.

A rate of a viscosity at 25° C. of the composition spent 12 weight % acid to a viscosity at 25° C. of the composition spent 4 weight % is preferably 20 to 60, 25 to 55, 30 to 50.

A rate of a viscosity at 25° C. of the composition spent 18 weight % acid to a viscosity at 25° C. of the composition spent 12 weight % is preferably 0.016 to 0.05, 0.018 to 0.04, 0.02 to 0.03.

Preferable viscosity range at 25° C. 58 $S^{-1}$, for each acid spent, of the composition is following A viscosity at 25° C. of the composition spent 4 weight % acid is preferably 1 to 100 cP, 1 to 75 cP, 1 to 50 cP.

A viscosity at 25° C. of the composition spent 8 weight % acid is preferably 250 to 700 cP, 275 to 550 cP, 300 to 500 cP.

A viscosity at 25° C. of the composition spent 12 weight % acid is preferably 500 to 1000 cP, 525 to 900 cP, 550 to 800 cP.

A viscosity at 25° C. of the composition spent 16 weight % acid is preferably 300 to 800 cP, 350 to 700 cP, 400 to 600 cP.

A viscosity at 25° C. of the composition spent 18 weight % acid is preferably 1 to 100 cP, 1 to 75 cP, 1 to 50 cP.

2. Method of Producing the Composition

A method of producing a composition comprises a step of mixing a modified nanomaterial and a viscoelastic surfactant. In the mixing step, other component may be mixed when need.

The mixing step may include the following steps in following order: a step of mixing the modified nanomaterial with solution to obtain solution A: a step of adding the polymer the additive, the acid and/or the solution into the solution A to obtain solution B: a step of adding the viscoelastic surfactant into the solution B to obtain solution C. In addition, the mixing step may include a step addition the counterion compound such as sodium salicylate into solution C.

A mixing method in the mixing step is not particularly limited, and hitherto known processes can be applied. Examples of such method include mechanical mixing method such as vertex and the like, and sonication.

3. Method of Forming an Oil or Gas Fell

A method of forming an oil or gas well comprises a step of preparing a fluid comprising a solvent, a viscoelastic surfactant, a modified nanomaterial, and an acid material, and a step of introducing the fluid into the well.

In addition, the method of forming an oil or gas well may further include a step of supplying acid in the fluid introduced into the well. The fluid which include the composition waste or consume acid for reacting with minerals such as calcite or dolomite. The fluid can keep forming the well by the acid supplying step.

4. Summary

The disclosure involves the development of high performance and functional viscosified oilfield chemicals based on viscoelastic surfactants (YES) for well-stimulation and completion applications. This includes acid well stimulation, formation control and diversion to create higher permeability and conductivity pathways in wells. By focusing on acid or acid treatment formulations, the stability of the YES was tested against various concentrations and composition in the presence of brine, controlled pressure and temperatures and its effect on viscosity or rheology. The formulation included the addition of nanocellulose, polymer, nanoparticles, and other additives to enhance performance and functionality towards cost-effectiveness. This involve the modification of the particles and additives with salinization and grafting of polymers. Complexation with polymers on the additives were also done. Tests included physico-chemical determination of properties against various control colloidal formulations. The improvement and control in the property was evident with the resulting formulation showing the combination of cationic YES and nanocellulose (CNC) have superior performance. Also modification with grafted or complexed colloidal polymer solutions enabled stimuli-responsiveness. The higher stability of the cationic-VES-NO composition was demonstrated against a host of brine, temperature, and pH conditions which showed better acid stimulation properties as against YES without the modified additives. The results also confirmed uses for acid stimulation against concentration with acid spending tests indicating self-diverting acid (SDA) behavior. Lastly, higher temperature performance was observed with the stability of the VES-CNC vs. control samples.

4.1. We have developed viscosifying media for completion and stimulation of oil/gas wells with low and high permeability and depth. This involves the preparation of acidified viscoelastic surfactant (YES) media based on cationic, anionic, zwitterionic, and amphoteric surfactants with a compatible counterion compound resulting in a concentration dependent viscous behavior stable at ambient to high temperature. This is exemplified with the CTAB-NaSal or cetytrimethyl ammonium bromide-sodium salicylate system and other combination of surfactants and counterion compounds thereof. The phenomena is based on the formation of higher order worm-like micelles and their networking-gel properties.

4.2. Additives can be formulated and combined at a specific order with the VES-Complex resulting in a stabilized colloidal solution and viscosified networked gel resulting in a higher stability and higher temperature property. The additives can be based on particle, chemically and surface modified particle, or small molecule resulting in a nanostructured complex.

4.3. Molecule and large molecule additives can be formulated and combined at a specific order with the VES-Complex resulting in a stabilized colloidal solution and viscosified networked gel resulting in a higher stability and higher temperature property. The additives can be based on chemicals exhibiting: corrosion inhibition, scaling inhibition, biocide, fluid loss agent, formation stabilizer, etc. resulting in a complex fluid.

4.4. Specifically, nanoparticle materials can be added at a specific order based on: silica nanoparticle, modified silica nanoparticles, nanoclay, cellulose in combination with cationic, anionic and zwitterionic composition. Physico-chemical characterization and standardized testing methods based on these optimized formulations results in higher stability and stimuli-responsive properties.

4.5. Specifically, polymer materials can be added at a specific order based on: polyelectrolyte, water-soluble polymers, and other polymers, in combination with cationic, anionic and zwitterionic composition. Physico-chemical characterization and standardized testing methods based on these optimized formulations results in higher stability and stimuli-responsive properties.

4.6. Specifically, nanoparticle materials can be added at a specific order based on: nanocellulose (CNC) derived from cellulosic sources (wood pulp, cotton, agricultural waste, etc.) in combination with cationic, anionic and zwitterionic composition. Physico-chemical characterization and standardized testing methods based on these optimized formulations results in higher stability and stimuli-responsive properties.

4.7. Specifically, chemically and surface modified nanoparticle materials can be added at a specific order based on: nanocellulose (CNC) in combination with cationic, anionic and zwitterionic composition. Physico-chemical characterization and standardized testing methods based on these optimized formulations results in higher stability and stimuli-responsive properties.

4.8. Specifically, nanoparticle materials can be added at a specific order based on: nanocellulose (CNC) in combination with cationic, anionic and zwitterionic composition demonstrated a good enhancement in diverting and self-diverting acid (SDA) properties and good break down of micelle when depleting most of HCl with stimuli responsive properties.

4.9. Specifically, nanoparticle materials based on: nanocellulose (CNC) in combination with cationic, anionic and zwitterionic composition demonstrated a good enhancement in stability and viscosity at higher temperatures with rheometry done for example at $100\ s^{-1}$ of shear rate, 400 psi and ramping temperature from 77 F (25° C.) to 350 F (176° C.) with a ramping rate 10 F/min.

4.10. Specifically, polymer materials based on commercially derived polymers complexed with CNC in combination with cationic, anionic and zwitterionic composition demonstrated a good viscosity enhancement in stability at higher temperatures and SDA properties with stimuli responsiveness.

4.11. Specifically, surface modified nanoparticle, polymer materials based on grafting the polymers on the surfaces and complexed with CNC in combination with cationic, anionic and zwitterionic compositions. They have demonstrated a good viscosity enhancement in stability at higher temperatures and SDA properties with stimuli responsiveness.

4.12. Specifically, surface modified nanoparticle, polymer materials based on grafting the polymers on the surfaces and complexed with CNC in combination with cationic, anionic and zwitterionic compositions. Grafting involves: 1) surface initiated polymerization (SIP) or "grafting from", 2) "grafting to or grafting onto", and 3) "grafting through". The method can also involve chemical adsorption or physical adsorption. They have demonstrated a good viscosity enhancement in stability at higher temperatures and SDA properties with stimuli responsiveness.

EXAMPLES

The present invention will be described below in more detail with reference to examples, but it should be construed that the scope of the present invention is in no way limited to these examples.

1. Control Experiments

Specify a current formulation of a VES and acid stimulation fluid composition and designated as a control or a published patent composition. This can be differentiated by the type of surfactants and other additives in the current formulations. It is important to identify the ratio or percentage of the surfactant, the counterion compound, and determination of a minimum percolation threshold of a desired property. It should be possible to identify the different type of surfactants used including any co-surfactants and solvents and the presence of soluble salts.

2. Stability Comparison

The first step is to determine the stability of the fluids under acid conditions of various pH. Acid spending tests will simulate the ability of the VES formulation to react with calcite and dolomite formations. It is important then to monitor the changes of the VES in stability over time with various pH and temperature conditions 3. New Compostions Modifications in the compositions with counterion compounds, polymer complexes, and chemical structure of the surfactants. This will involve determining the advantages of cationic, anionic, and zwitterionic surfactants. Fluids, which can contain two or more different surfactants: preferably anionic or nonionic, thereby leaving reservoir rocks water-wet for better fluid mobility through the formation. Specific organic counterion compounds will be used that are more suitable for acid stimulation conditions. Various surface modification protocols of the additive by silanes (sulfonate, carbonate, epoxy, amine, etc.) or with polymer grafting will lead to acid stability and stimuli-responsive properties. By careful design, these fluids have been specifically tailored to give characteristics of viscosity, solubility and temperature stability suited to specific stimulation applications.

4. Testing and Characterization

Physico-Chemical Characterization and Experiments include:
1) viscosity measurements of various concentrations (1-10%) of VES vs T, salt conditions.
2) Viscosity measurements against various pH and salt conditions.
3) Viscosity decrease monitoring vs increasing shear rate in op or Pas.
4) Rheology and viscoelastic properties. Tests will be done against controlled additives with known or reported compositions: a) rheology, b) stability with T and P. c) stability with pH and salt. d) flow conditions in controlled permeabilities, e) ability to be a carrier for other additives (non-water soluble).

Desirable properties to be monitored include: higher viscosity across a wide range of temperatures, particularly at the high end and at the low surfactant loading which reduces cost. They should also be effective in a number of salt brines, including seawater needed to effect formation stability. The maintenance of high viscosity at low pH and various salt conditions is important for acid stimulation and acid fracturing applications. Stimuli-responsive properties should also be observed—shift in peak dissolution rates, shift in viscosity with concentration range, and shift in viscosity with time.

5. Polymer Composition and Nanostructuring

Polymer-surfactant complexes are generally more stable than small molecule surfactants. Addition of polymers, nanoparticles and nanostructuring of complexes will necessitate the following:
1) investigate improved stability of polyelectrolyte-surfactant complexes and higher order micelles at particular concentrations.
2) investigate the formation of stable complexes to show stimuli-responsive properties and gradient properties (concentration dependence).

In particular, the addition of clay and silica nanomaterial s, graphene nanoparticles, nanocellulose nanoparticles and nanofibers can lead to micellar stability and better colloidal properties with minimum percolation threshold. The additives can lead to stimuli-responsiveness, improved fluid loss prevention, increased corrosion resistance, and fluid stability at high T and P conditions. In-situ polymerized polymer-polyelectrolyte complexes or polymer-grafted nanoparticle complexes (surface modification) as new additives to VES fluids is possible.

6. Acid Stimulation and Fracturing Properties

After determining the stability of the formulated VES and nanomaterial formulated VES under low pH (high acid content) and various salt concentrations their ability to react with the simulated formation minerals will be investigated. Stimulation of carbonate rocks usually involves a reaction between an acid and the minerals calcite ($CaCO_3$) or dolomite $CaMg(CO_3)_2$ like composition. Reaction rate with these minerals will be observed by titration type analysis both at ambient and pressurized conditions. Various acid concentrations involving HCl with 1-30 wt % addition will be used. The change in viscosity will also be monitored as a function of time using viscosity and rheology measurements with temperature control.

7. The Main Protocol and Formulation

Preparation of VES compositions of a specific surfactant (or with co-surfactant) and counterion compounds range from 1-10% by weight concentrations. This is simply done by the addition of the surfactant to water and brine or salt to result in a translucent clear solution and increase in viscosity (shear thinning). The mixing can be done by manual and mechanical mixers or the use of sonication. Once the VES solution is prepared it can be tested for physico-chemical properties including viscosity or rheology. In addition, various compositions containing polymers, nanomaterial s, and actives (additives) and repeat the measurements as in previous benchmarking with control experiments. This has the potential to stabilize these micelles through complexes that result in stable networks and anchoring of micelles through orthogonal assembly.

8. Example Total Centration Protocols

Assuming from a total of 100% in which the rest of the composition is Water using Cetyl trimethyl ammonium bromide (CTAB) as an example surfactant:

CTAB-VES1: CTAB (6 wt %)+$CaCl_2$ (30 wt %)+Water (64 wt %)

CTAB-VES 2: CTAB(6 wt %)+Na Salicylate (0.5 wt %)+Water (93.5 wt %)

COMM-VES 3: Commercial Surfactant (6 wt %)+Na Salicylate (1 wt %)+Water (93 wt %).

Commercial Surfactant (6 wt %)+$CaCl_2$ (30 wt %)+Water (64 wt %)

~ assume dilution from a stated wt % of a commercial sample.

CTAB-VES—NANO with CTAB: (Y wt %)+Na Salicylate (0.5 wt %)+Nanoadditive (X wt %)+Water (93.5 wt %).

CTAB-VES—POLY with CTAB: (Y wt %)+Na Salicylate (0.5 wt %)+Poly (X %)+Water (93.5 wt %)

CTAB-VES—ACTIVE with CTAB: (Y wt %)+Na Salicylate (0.5 wt %)+ACTIVE (X wt %)+Water (93.5 wt %)

ACIDIFICATION: Add varying concentrations of HCl in order to Adjust pH

CONTROL: Commercial surfactant or polymer sample

9. Properties Desired

Some of the properties to be monitored include the following:

1. Stability at various temperatures to maintain viscosity value and retain transparency or cloud point. Viscosity in cp (10×) 500-10 sec1 range, which decreases from 50-100° C. or with increasing shear rate.

higher concentrations, addition of salts, and addition of alcohol co-surfactants is acceptable for stabilization.

2. Stability in fresh water or brine conditions up to seawater (100.000-300,000 ppm).

3. Stability at low pH conditions with 1-20 wt % of added acid content.

4. Stability of VES under various acidic conditions with specified higher pressures and temperatures.

10. Viscosity and Rheology

Initial Formulation:
   Viscosity at various temperatures—Though most of the temperatures in acid stimulation are ambient temperatures.
   Viscosity vs Time at a constant temperature
   Different concentrations: 3-10% of VES, 5-15% of HCL and HF, 5-15% with NaCl, Mg or $CaCl_2$, or Buffer Salt
   pH from 0-7. Viscosity measurements, various temperatures—25 to 60° C.
   Change in Viscosity vs Increasing amounts of HCl sequence (spent acid)
   Increasing concentration over time.
   Self-Diverting Acid (SDA) Properties
   Stages of different Viscosifying Properties with changes in permeability
   Permeability to simulate calcite and sandstone formations

11. Data and Results

The results of the study pertaining to the methodologies used and the compositions and conditions are outlined from A-G.

The best results are: Use of CTAB surfactants with added cationic-CNC and polymer grafted CNC demonstrating the best improvement of viscosity at both room temperature and 60° C. The CNC-Polyvinyl alcohol or CNC-PVA premixed solid (1:1) also resulted in improved viscosity at higher temperature. The self-diverting acid properties show stimuli-responsive behavior on all the studies resulting in the ability to shift dissolution properties with pH. The summary of the procedures and results in each section from A-G are thus used to support the claims in this patent filing.

A) Studied HCl Spending of CTAB VES with Cellulose Nanocrystal (CEC):

Typical preparing procedure for 12% HCl spent solution (20% max, 8% remaining) Compositions was produced by mixing components shown in table 1. First, master solution A of CNC was prepared by dissolving CNC in water and sonication for over 1 h. And then, hydrochloric acid, water, CTAB was added in this order to the solution A and vertex mixed until the CTAB totally dissolved to obtain solution B. Finally, NaSal solution added to the solution B and vertex mixed. Gelled-like solution will form in seconds. The obtained solution was allowed to settle down for overnight to remove the bubbles. The amount of HCl was adjusted based on HCl concentration.

The acid sensitivities of the compositions are shown in FIG. 1. In FIG. 1, the vertical axis shows viscosity, and the horizontal axis shows HCl concentration added in the composition. FIG. 1 (*a*) to (*c*) show the acid sensitivities at 25 to 60° C.

TABLE 1

|  | Example 1 | Comparative Example 1 |
| --- | --- | --- |
| CTAB*[1] | 3 wt % | 3 wt % |
| NaSal*[2] | 0.5 wt % | 0.5 wt % |
| CNC*[3] | 0.5 wt % | — |

*[1]CTAB: etyl trimethyl ammonium bromide
*[2]NaSal: sodium salicylate
*[3]CNC: COOH functionalized CNC obtained from Aloterra The HCl spending test with CTAB VES—CNC is important for proving the self-diverting acid properties (SDA) for acid well stimulation as well as formation control.

The addition of CNC (obtained from Aloterra which is —COOH functionalized) has the effect of increasing the viscosity in general especially at higher concentration—although the effect is almost incremental at low concentration (FIG. 1).

The CTAB behaved well mostly at higher concentration (more viscous) but did not remain as stable when the temperature increased.

Figure 2:
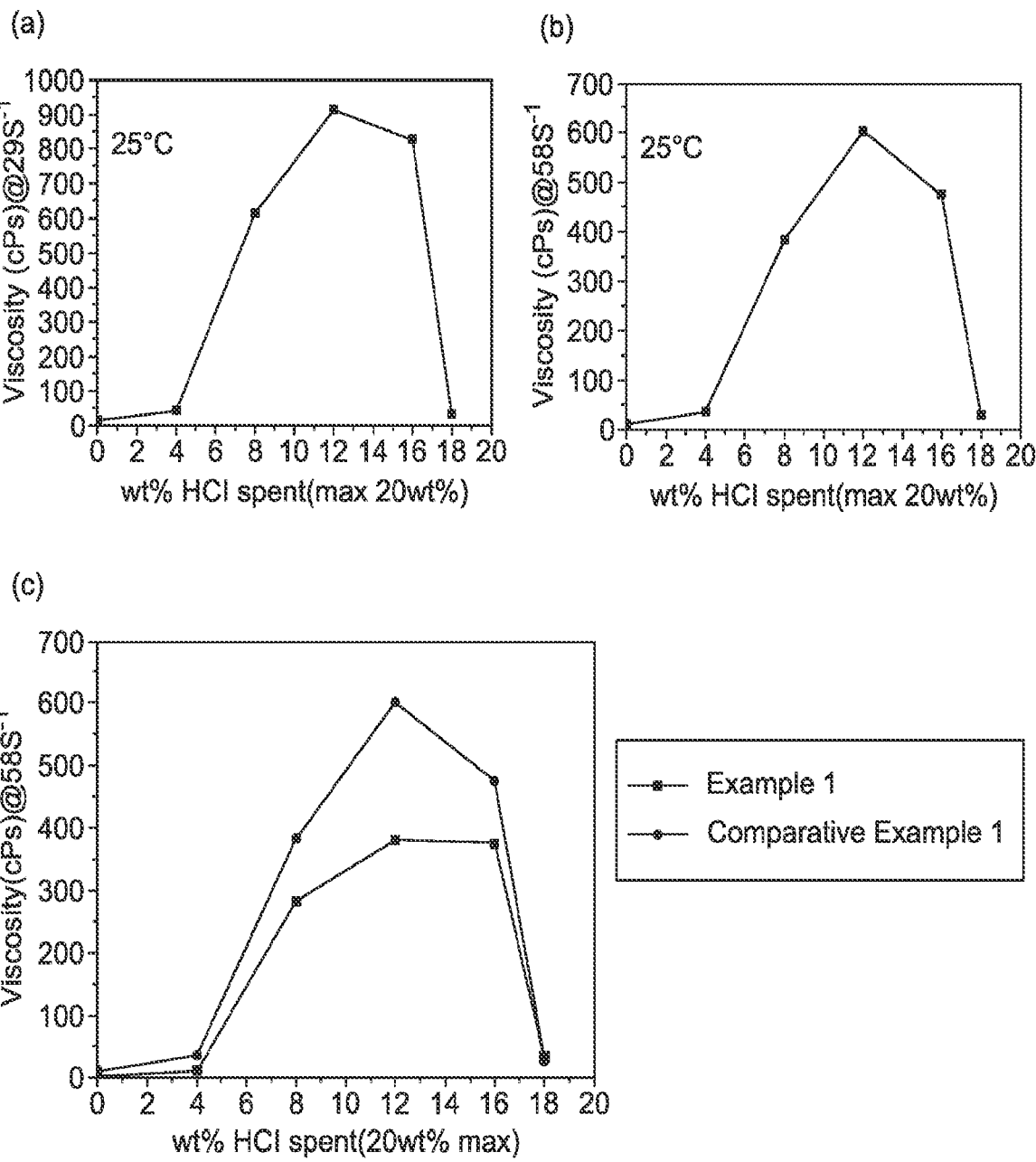
FIG. 2 shows HCl spending test in comparing between Example 1 and Comparative Example 1.

The Acid spending test showed a higher viscosity at the peak of the spending (FIG. 2). In general, the CNC demonstrated an enhancement in viscosity in the middle of spending curve-better diverting. However, the CNC demonstrated no influence on the point of breaking-same good break down The CNC size (whiskers or nanorods and nanofibers) can still be parametrized to achieve better performance such as modification of the —OH group of the polysaccharide with salinization, polymerization, or complexation.

The composition for HCl spending test was obtained by the same operations as above, except that CaCl2 was added to the gelled-like solution. The amount of CaCl2 was adjusted based on spent HCl amount.

The self-diverting acid property of the composition by HCl spending test are shown in FIG. 2. In FIG. 2, the vertical axis shows viscosity, and the horizontal axis shows HCl spent amount in the composition. The acid spending test simulated the ability of the composition to react with calcite and dolomite formations. FIGS. 2 (a) and (b) show viscosity behaviors of Example 1 depending on share rate at 25° C. FIG. 2 (c) shows a difference of the self-diverting acid property between Example 1 and Comparative Example 1.

B) Studied HCl Spending of CTAB VES with Nanoclay

Compositions was produced by mixing components shown in table 2. The compositions including nanoclay was obtained by the same operations as above, except that instead of the CNC, nanoclay was used.

TABLE 2

|  | Example 2 | Example 3 | Comparative Example 1 |
| --- | --- | --- | --- |
| CTAB*1 | 3 wt % | 3 wt % | 3 wt % |
| NaSal*2 | 0.5 wt % | 0.5 wt % | 0.5 wt % |
| Laponite*3 | 0.5 wt % | 0.25 wt % | — |

*1CTAB: cetyl trimethyl ammonium bromide
*2NaSal: sodium salicylate
*3Laponite-EP: NanoClay obtained from BYK The HCl spending test with CTAB VES—Nanoclay is important for proving the self-diverting acid properties (SDA) for acid well stimulation as well as formation control The addition of Nanoclay has the effect of increasing the viscosity in general especially at higher concentration—although the effect is almost incremental.

The CTAB behaved well mostly at higher concentration (more viscous) but did not remain as stable when the temperature increased.

Nanoclays charges and hydrophobicity can still be modified to surface modification with silane or cationic surfactants.

HCl Spending Test with NanoClay

With loading of 0.25% and 0.5% of nanoclay, the viscosity increased. However, increase of viscosity from 0.25% to 0.5% does not as obvious as CNC. The possible reason could be the aggregation of nanoclay in acid.

C) VES Surfactant Studies with Sulfated-CNC Obtained from Celluforce

Compositions was produced by mixing components shown in table 3. The compositions including sulfated-CNC were obtained by the same operations as above, except that instead of the CNC, sulfated-CNC was used.

TABLE 3

|  | Example 4 | Example 5 | Comparative Example 1 |
| --- | --- | --- | --- |
| CTAB*1 | 3 wt % | 3 wt % | 3 wt % |
| NaSal*2 | 0.5 wt % | 0.5 wt % | 0.5 wt % |
| sulfated-CNC *3 | 0.5 wt % | 0.25 wt % | — |

*1CTAB: cetyl trimethyl ammonium bromide
*2NaSal: sodium salicylate
*3 sulfated-CNC: obtained from Celluforce The self-diverting acid property of the composition by HCl spending test are shown in FIG. 3. In FIG. 3, the vertical axis shows viscosity, and the horizontal axis shows HCl spent amount in the composition. FIG. 3 shows viscosity behaviors of Examples 4 and 5, and Comparative Example 1.

Summary Discussion of CNC Additives

The previous carboxylated CNC (Aloterra) demonstrated good performance, which increased the highest viscosity but does not influence the break viscosity. However, the use of the sulfated CNC(CelluForce) demonstrated the highest viscosity stability at higher temperature—but also increased in the break viscosity.

Adding sulfonated CNC would make the CTAB-VES less transparent but still viscous.

With increasing concentration of CNC, the highest viscosity in HCl spending tests are increased.

The viscosity at 0% and 18% are also increased.

HCl Spending Test at High Temperature

With the increase of temperature from 25° C. to 60° C., the viscosity decreased from around 500 cPs to around 200 cPs. Compared to the CTAB system without any additive, the VES with 0.5% sulfated CNC demonstrated an increase in viscosity in all temperatures. This indicated the CNC helps the VES maintain high viscosity at higher temperature (FIGS. 3 and 4).

The zwitterionic surfactant and the counterion compound with sulfated CNC demonstrated a good stability with temperature. With less than 3% surfactant in total, the viscosity remains over 100 cPs even at 50° C. (FIG. 6) Examples of zwitterionic surfactants and the counterion compound are shown in FIG. 5.

Compared all the different VES, the CTAB with 0.5% CNC demonstrated the highest viscosity at both 50° C. and 60° C. While the zwitterionic/anionic VES demonstrated a good viscosity stability from 50° C. to 60° C. but a shift in the break behavior. All the VES systems demonstrated higher than 100 cPs viscosity at 60° C.

The self-diverting acid property at high temperature by HCl spending test are shown in FIG. 4. In FIG. 4, the vertical axis shows viscosity, and the horizontal axis shows HCl spent amount in the composition. FIGS. 4 (a) and (b) show viscosity behaviors of Examples 4 and Comparative Example 1 at high temperature.

Compositions was produced by mixing components shown in table 4. The compositions including were obtained by the same operations as above, except that instead of some components, following components were used.

TABLE 4

|  | Example 6 | Example 7 | Example 8 | Comparative Example 2 |
|---|---|---|---|---|
| SB3-18*[1] | 1.5 wt % | 1.5 wt % | 1.5 wt % | 1.5 wt % |
| SDBS*[2] | 0.5% | 0.5% | 0.5% | 0.5% |
| sulfated-CNC *[3] | 0.5 wt % | — | — | — |
| Laponite EP *[4] | — | 0.5 wt % | — | — |
| Laponite RDS *[5] | — | — | 0.5 wt % | — |

*[1]SB3-18: Stearyl Surlfobetaine obtained form Sigma- Aldrich
*[2]SDBS: Sodium Dodecyl Benzene Sulfonate obtained form Sigma- Aldrich
*[3] sulfated-CNC: obtained from Celluforce
*[4] Laponite EP: nanoclay obtained from BYK
*[5] Laponite RDS: nanoclay obtained from BYK The self-diverting acid property of the composition by HCl spending test are shown in FIG. 6. FIG. 6 (a) to (b) show the viscosities of Examples 6 to 8 and Comparative Example 2 at 25 to 60° C.

Figure 8:
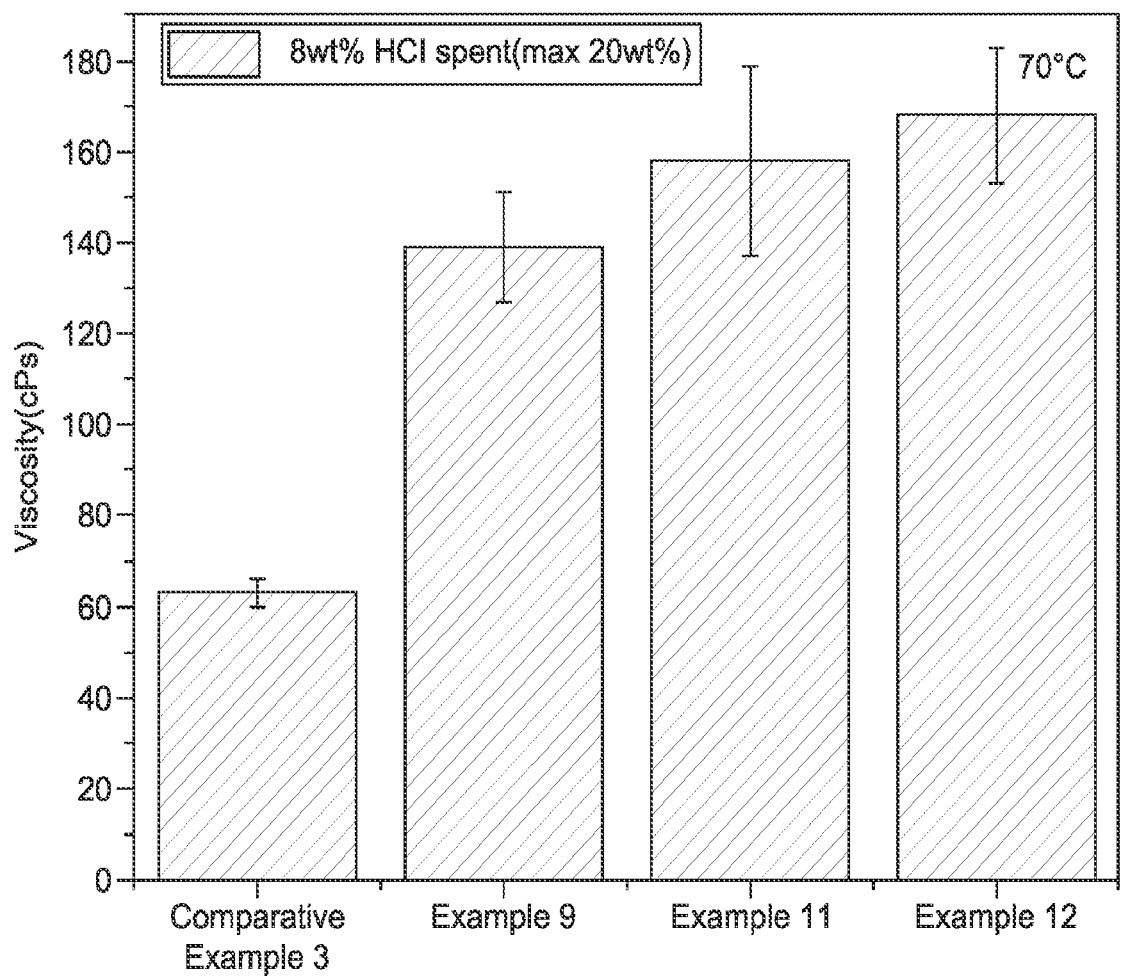
FIG. 8 shows HCl spending test in comparing between Examples 9, 11, 12 and Comparative Example 3.

D) Study of CTAB VES in Acid Spending and the Addition of Small Molecular and Polymers (FIGS. 7 and 8).

Compositions was produced by mixing components shown in table 5. The compositions were obtained by the same operations as above, except that additive was added into the composition.

TABLE 5

|  | Example 9 | Example 10 | Example 11 | Example 12 | Comparative Example 3 |
|---|---|---|---|---|---|
| CTAB*[1] | 3 wt % | 3 wt % | 3 wt % | 3 wt % | 3 wt % |
| NaSal*[2] | 0.5 wt % | 0.5 wt % | 0.5 wt % | 0.5 wt % | 0.5 wt % |
| sulfated-CNC *[3] | 0.5 wt % | 0.5 wt % | 0.5 wt % | 0.5 wt % | — |
| Ethylene glycol | — | 0.5 wt % | — | — | — |
| PEG 550 *[4] | — | — | 0.5 wt % | — | — |
| PEG 2000 *[5] | — | — | — | 0.5 wt % | — |

*[1]CTAB: cetyl trimethyl ammonium bromide
*[2]NaSal: sodium salicylate
*[3] sulfated-CNC: obtained from Celluforce
*[4] PEG 550: polyethylene glycol having 550 of a weight average molecular weight
*[5] PEG 2000: polyethylene glycol having 2000 of a weight average molecular weight The self-diverting acid property of the composition by HCl spending test are shown in FIGS. 7 and 8. FIG. 7 (a) to (b) show the viscosities of Examples 9 to 12 and Comparative Example 3 at 25 to 60° C. FIG. 8 shows the viscosities based on additives at 70° C. in 8 wt % HCl spent solution (max 20 wt %).

1. 0.5% CNC demonstrated good enhancements in viscosity compared with no additive and can also increase the performance at 60° C. which is consistent with our previous result.
2. Adding 0.5% ethylene glycol may not significantly influence the viscosity at high temperature.
3. Adding 0.5% polyethylene glycol (PEG) slightly increases the viscosity at both room temperature and 60° C.
4. The influence of PEG is dependent on Molecular weight, the higher molecular weight the higher the stability.

At 70° C., the evaporation of CTAB is severe. By controlling the same operation time, the viscosities can be compared relatively. The result demonstrated CNC will increase the viscosity of CTAB VES, and adding a higher MW PEG to CTAB VES and CNC will also improve the viscosity.

E) Study of Silane Functionalized CE:

Procedure and Synthesis of Silane Functionalized CNC of Various Silane Structures (FIG. 9):

Silane Modification by Direct Mixing Silane Agent and Sulfated CNC Powders:

1. 2 mL silane was added to a vial contains 500 mg sulfated CNC powders
2. Vigorously stirring was applied to make sure the powders dispersed uniformed.
3. The reaction was heated to 40° C. and the mixture was allowed to react 36 h
4. The suspension was purified by vacuum filtration and wash with 50 mL of ethanol For APTMS:

After functionalization, the initial thermal degradation temperature and temperature at the maximum degradation rate are both increased, which could be due to the interaction between the silane and CNC (Si—O—C).

The increase in the residue mass is attributed to the siloxyl group, which is also supported by the literature.

For AEAPTMS:

The initial thermal degradation temperature and temperature at the maximum degradation rate are both increased.

No residue mass difference, which could be attributed the less functionalization (smaller N—H peak)

Summary of Results for Silane Surface Functionalized CNC and viscosity measurements:

The formulation 3% CTAB+0.5% NaSal+0.5% (CNC) after 12% HCl spent (20% max) was tested. According to the viscosity study results, all the silane modified CNC demonstrated negligible viscosity change over non-modified CNC, which could be due to all the silane agent make the CNC more hydrophobic. (FIG. 10) Therefore the silane modified CNC tend to form big aggregations and will not disperse well in VES:

1. Four Silane modified CNC has been prepared. However, FTIR and GO-IS imply the functionalization is not successful. The TGA of CNC-APTES and CNC-AEAPTMS demonstrated the significant difference with the unmodified CNC, while CNC-GPTES demonstrated no difference. Prepared with CTAB and NaSal, the CNC-GPTES demonstrated no influence with viscosity, while CNC-APTES and CNC-AEAPTMS demonstrated negative influence on the viscosity. A higher temperature trial will be conducted to optimize the functionalization.
2. Graphene Oxide was added to the Zwitterionic/Anionic system as the second additive, however, the influence of the GO on the viscosity is not significant.
3. The viscosity result in zwitterionic VES demonstrated the same results, all the silane modified CNC demonstrated lower viscosity than non-modified CNC, which could be due to all the silane agent make the CNC more hydrophobic.

Figure 11:
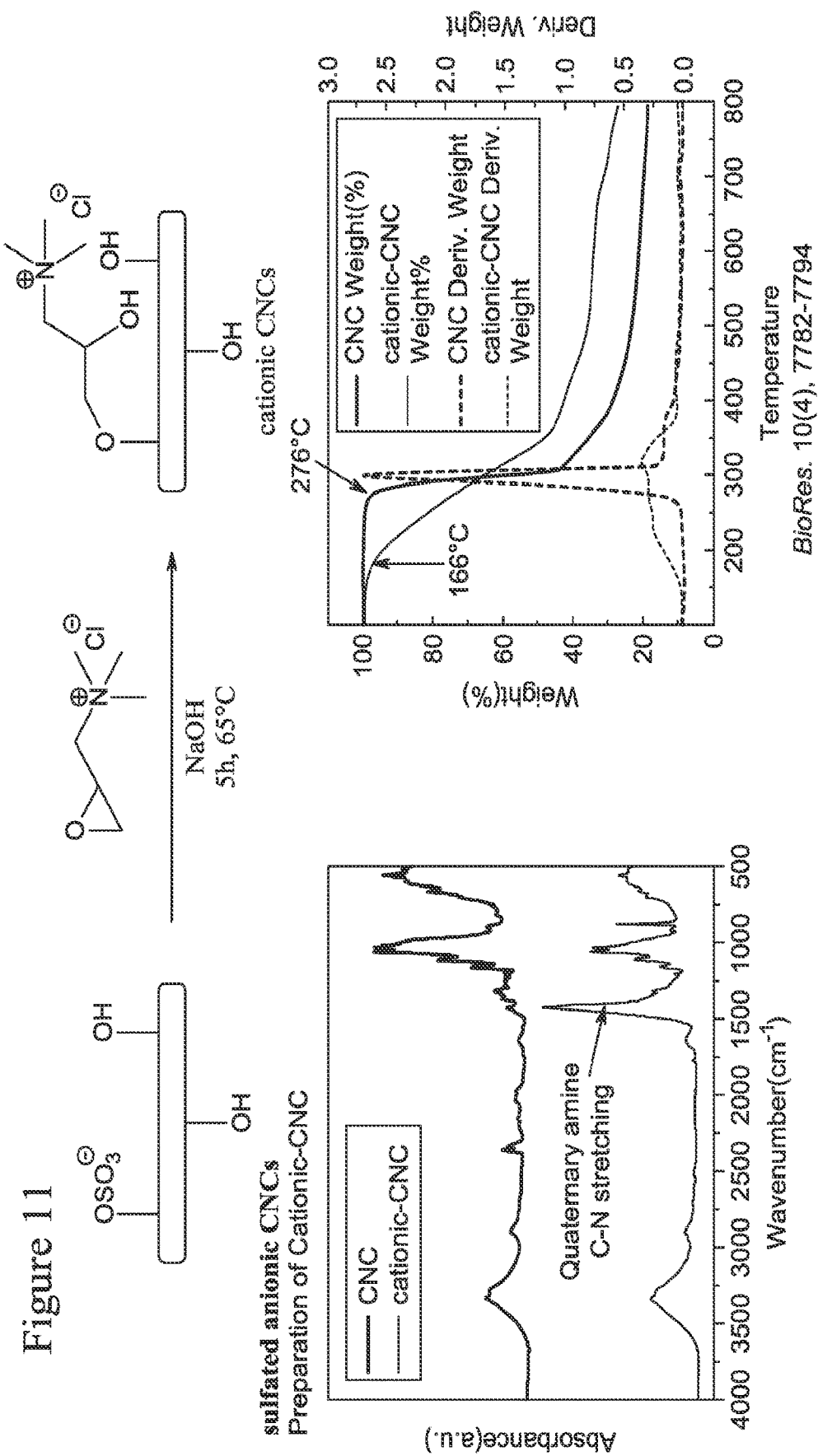
FIG. 11 shows a scheme of medication of CNC, and FTIR and TGA result of cationic-CNC.

Procedure. For Cationic Modification of CNC:
Preparation of Cationic CNC
1. Sulfated CNC aqueous suspension (2 wt %) was treated with diluted alkaline solution (NaOH, 2 wt %) for 30 min at room temperature.
2. 2,3-Epoxypropyl trimethyl ammonium chloride (EPTMAC) was dropping into the suspension with the NaOH as the catalyst, and the reaction lasted for 6 h at 65° C.
3. After the reaction, the suspension (~2 wt %) was precipitated in ethanol, and the product was collected by centrifugation.
4. The EPTMAC-cationic cellulose nanocrystals (Cationic-CNC) were redispersed by dialysis against the distilled water (~2 wt %) for 5 days IR and DSC date confirmed the successful grafting of the cationic silane on CNC (FIG. 11)

F) Study of Polymer Grafted CNC
Preparation of Polymer Grafted CNC
Step 1: Synthesis of CNC-Initiator
1. Sulfated CNC (1 g) were dispersed into dry N, N-dimethylformamide (DF) (60 mL) by stirring and sonicated for 1 h at room temperature. After triethylamine (TEA) (2.50 g) and N,N-dimethyl-4-aminopyridine (DMAP) (180 mg) were added into the suspension, the solution of 2-bromoisobutyryl bromide (BiBB) (7.80 g) in DMF was added dropwise into the mixture for 2 h.
2. The mixture was stirred at room temperature for another 12 h before 10 mL methanol was introduced. After centrifugation (4.4 k rpm), the crude product was washed with Methanol for three times.

Step 2: Synthesis of Polymer Grafted CNC
1. A mixture of CNCs-Br suspension (30 mg), Monomer (Poly(ethylene glycol) methyl ether methacrylate (PEGMEMA), 2-(Dimethylamino)ethyl Methacrylate (DMAEMA), 2 g), Methanol (around 2.0 mL) and Cu(I)Br (28 mg) were placed into the Schlenk tube with a magnetic stirring bar.
2. After being purged with $N_2$ for 30 min. degassed 1, 1, 4, 7, 10, 10-Hexamethyltriethylenetetramine (HMTETA) (20 µL in 1 mL Methanol) were injected into the mixture. T
3. The polymerization was carried out at room temperature for overnight, and then the Schlenk tube was opened to air to quench the reaction.
4. After diluting with ethanol, the suspension was centrifuged (4, 4 k rpm), and the supernatant was collected and wash with Methanol for 3 times.

Compositions was produced by mixing components shown in table 6. The compositions were obtained by the same operations as above, except that grafted CNC were used.

TABLE 6

|  | Example 13 | Example 14 | Example 15 | Example 16 |
| --- | --- | --- | --- | --- |
| CTAB*[1] | 3 wt % | 3 wt % | 3 wt % | 3 wt % |
| NaSal*[2] | 0.5 wt % | 0.5 wt % | 0.5 wt % | 0.5 wt % |
| sulfated-CNC *[3] | 0.5 wt % | — | — | — |
| Cationic-CNC*[4] | — | 0.5 wt % | — | — |
| PDMAEMA-CNC*[5] | — | — | 0.5 wt % | — |
| CNC-PVA-premixed *[6] | — | — | — | 0.5 wt % (CNC) |
|  |  |  |  | 0.5 wt % (PVA) |

*[1]CTAB: cetyl trimethyl ammonium bromide

*[2]NaSal: sodium salicylate

*[3] sulfated-CNC: obtained from Celluforce

*[4]Cationic-CNC: modified-CNC obtained by the above.

*[5]PDMAEMA-CNC: grafted-CNC obtained by the above.

*[6] CNC-PVA-premixed: a mix of sulfated-CNC (0.5 wt %) and polyvinyl alcohol (0.5 wt %)

The self-diverting acid property of the composition by HCl spending test are shown in FIG. 13. FIG. 13 show the viscosities of Examples 13 to 16 at 25 to 60° C. in 12 wt % HCl spent solution (max 20 wt %).

Results for the Synthesis and Surface Initiated Polarization (SIP) on CNC

FTIR spectra demonstrated the successful functionalization of ATRP-initiator and polymerization of PDMAEMA by detecting C=O stretching (FIG. 12). With only ATRP-initiator, the CNC is less thermally stable (161° C.). After SIP polymerization, the degradation temperature is increased to 231° C. Besides. CNC-PDMAEMA has less residue mass, which also supported the successful polymerization or grafting of PDMAEMA on CNC. Likewise the successful grafting of CNC-PPEGMEMA was shown in FIG. 13.

Results with Viscosity Measurements

Synthesis of cationic-CNC and polymer grafted CNC was performed. The result demonstrated the successful functionalization, which was proved by FTIR and TGA (FIGS. 12-13).

Figure 14:
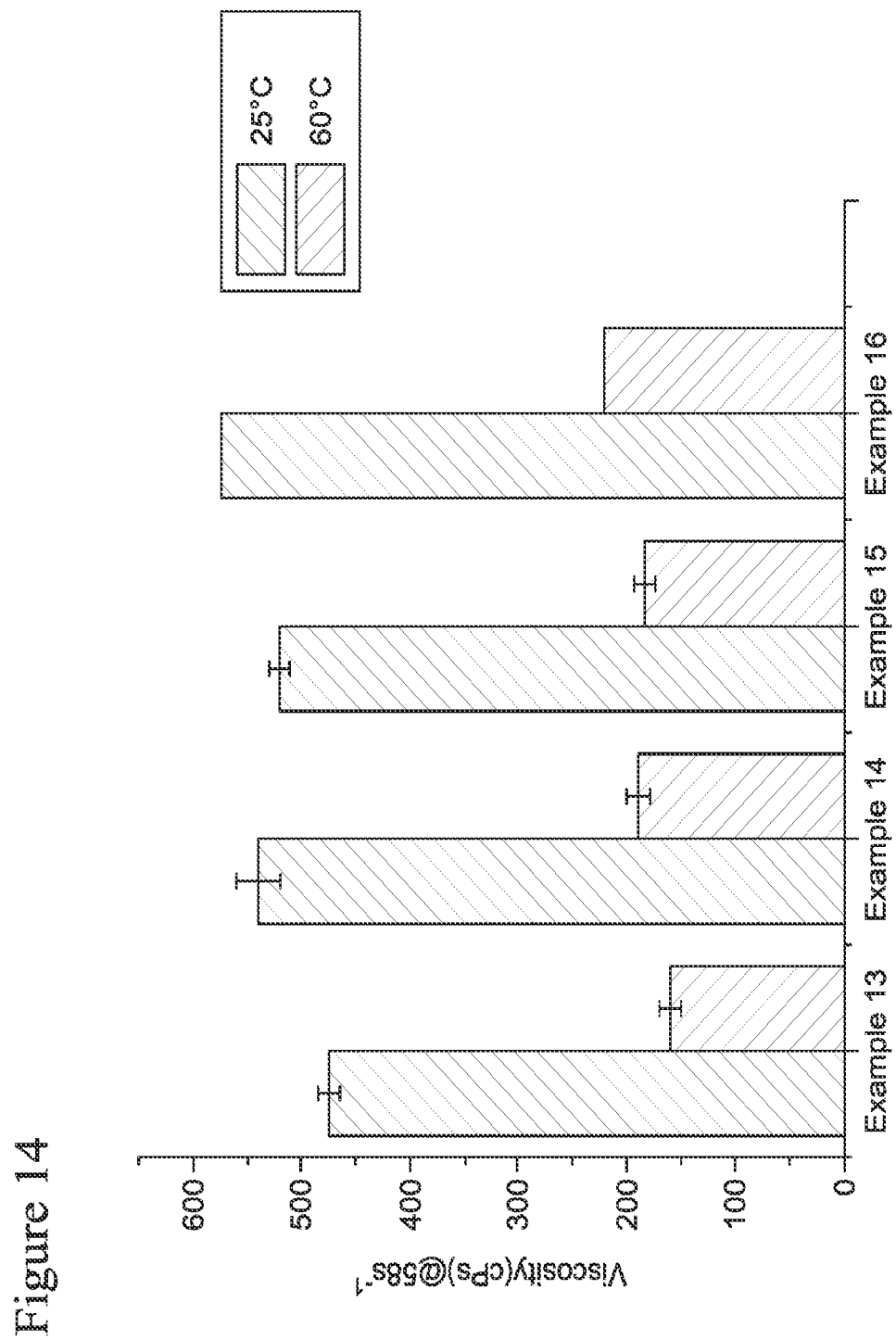
FIG. 14 shows viscosity differences between temperatures in comparing between Examples 13 to 16.
Figure 15:
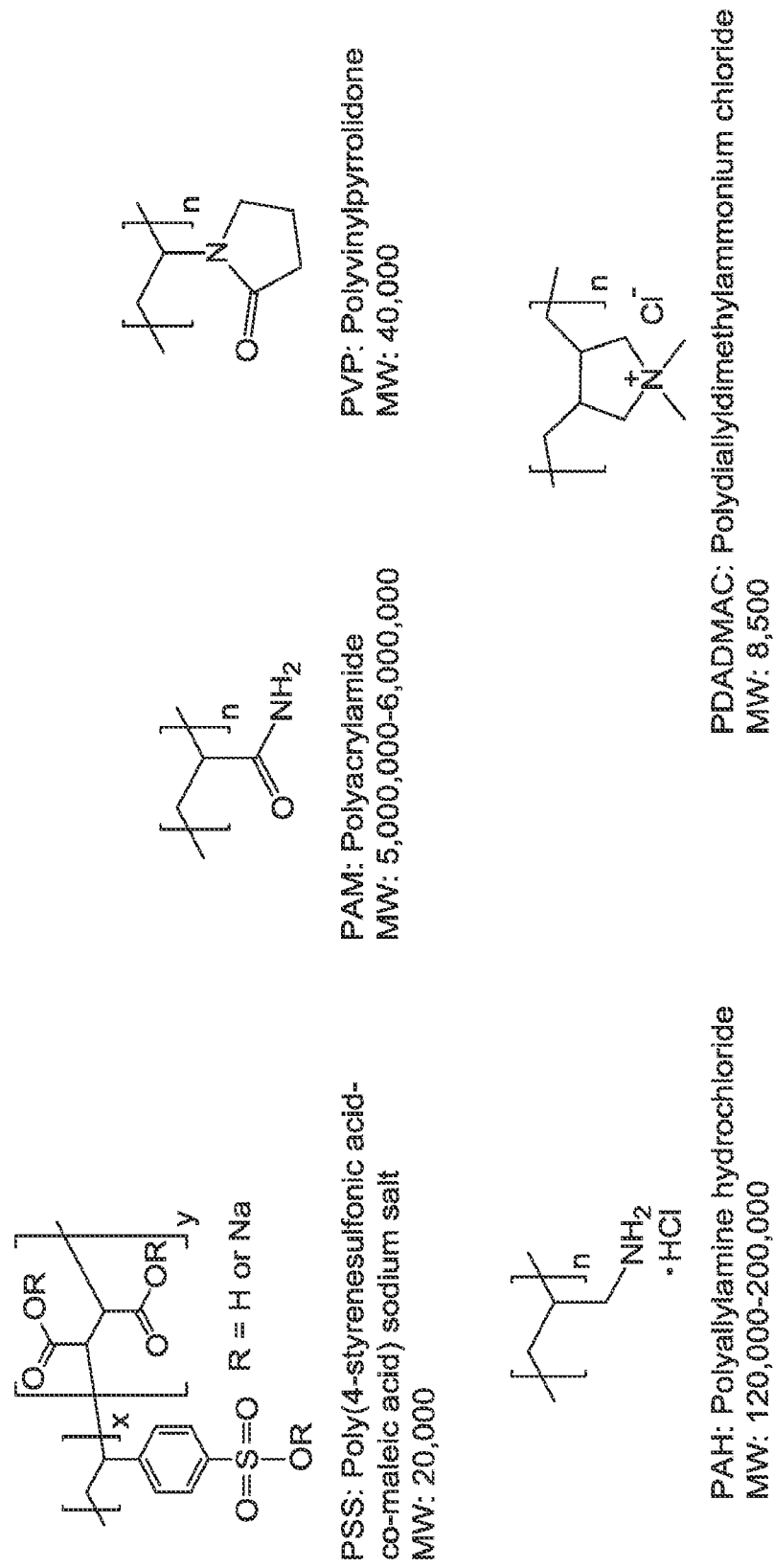
FIG. 15 shows additive candidates.

Cationic-CNC and polymer-grafted-CNC demonstrated the best improvement of viscosity at both roan temperature and 60° C. The CNC-Polyvinyl alcohol or CNC-PVA premixed solid (1:1) was also tested as the additive, 1 wt % is added to the VES. This viscosity demonstrated the same improved viscosity as directly adding 0.5% of each in the VES. The results are summarized in FIG. 14.

6) Study of Additive Polymer

G-1. Example A

Compositions was produced by mixing components shown in table 6 based on following method.

Typical preparing procedure for 12% HCl spent solution (20% max, 8% remaining)

1. Master solution of 2 wt % CNC was prepared by dissolving CNC in water and sonication for over 1 h.
2. 2.5 g of 2 wt % CNC solution was added to a 20 mL vial
3. 50 mg-300 mg polymer was added to the vial
4. 2.3 g of Hydrochloric acid was added to the vial
5. 4.2 g of water was wadded to the vial
6. The solution was vertex mixed and sonicated until the polymer totally dissolved
7. 0.3 g of CTAB was added to the solution and vertex mixed until the CTAB totally dissolved.
8. Master solution of 5 wt % NaSal was prepared by dissolving NaSal in water.
9. 1 g of 5 wt % NaSal solution was added to the CTAB solution and vertex mixed. Gelled-like solution will form in seconds
10. 1.8 g of $CaCl_2$ was added to the gelled-like solution and vertex mixed. Calculated from HCl spent 1 g HCl to 1.5 g $CaCl_2$.
11. The solution was allowed to settle down for overnight to remove the bubbles.

TABLE 7

|  | Example 17 | Example 18 | Example 19 | Example 20 | Example 21 | Example 22 |
| --- | --- | --- | --- | --- | --- | --- |
| CTAB[1] | 3 wt % | 3 wt % | 3 wt % | 3 wt % | 3 wt % | 3 wt % |
| NaSal[2] | 0.5 wt % | 0.5 wt % | 0.5 wt % | 0.5 wt % | 0.5 wt % | 0.5 wt % |
| sulfated-CNC [3] | 0.5 wt % | 0.5 wt % | 0.5 wt % | 0.5 wt % | 0.5 wt % | 0.5 wt % |
| PSS[4] | 0.5-3.0 wt % | — | — | — | — | — |
| PAM[5] | — | 0.5-3.0 wt % | — | — | — | — |
| PVP [6] | — | — | 0.5-3.0 wt % | — | — | — |
| PAH[7] | — | — | — | 0.5-3.0 wt % | — | — |
| PDADMAC[8] | — | — | — | — | 0.5-3.0 wt % | — |

[1] CTAB: cetyl trimethyl ammonium bromide

[2] NaSal: sodium salicylate

[3] sulfated-CNC: obtained from Celluforce

[4] PSS: poly(4-styrenesulfonic acid-co-maleic acid) sodium salt obtained by Sigma-Aldrich.

[5] PAM: polyacrylamide obtained by Sigma-Aldrich.

[6] PVP: polyvinylpyrrolidone obtained by Sigma-Aldrich

[7] PAH: poly(allylamine hydrochloride) obtained by Sigma-Aldrich

[8] PDADMAC: poly(diallyl dimethyl ammonium chloride) obtained by Sigma-Aldrich

Figure 16:
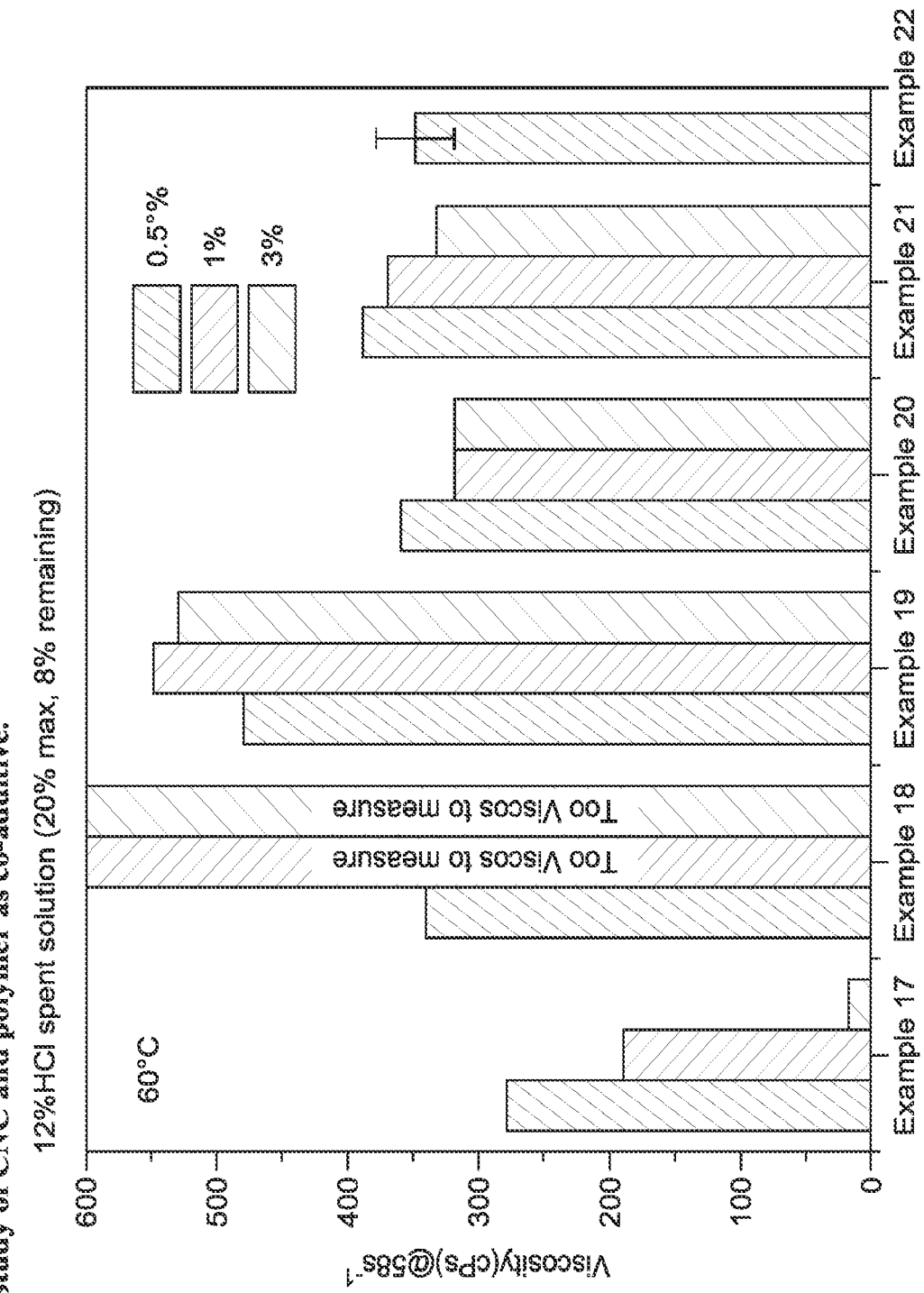
FIG. 16 shows HCl spending test in comparing in comparing between Examples 17 to 22.

The self-diverting acid property of the composition by HCl spending test are shown in FIG. 16. FIG. 16 shows the viscosities based on difference of additives and a content of additives in 12% HCl spent solution (20% max. 8% remaining).

PVP:

Adding 0.5% of PVP, the result demonstrated an increase in viscosity. Adding 1% of PVP the result demonstrated a higher increase in viscosity but do not have much difference with adding 3% 70° C. was tried, showing later.

PAM:

Adding 0.5% of PAM demonstrate no difference in viscosity at 60° C. while adding 1% or 3% will make the solution too viscos to be measured at 58 $S^{-1}$ (limitation of the viscometer).

PAH, PDADMAC and PSS

Adding PAH and PDADMAC does not influence to the viscosity, while PSS will decrease the viscosity.

Acid spending studies also showed consistent behavior for PVP. HCl spent test is to prepare different HCl and $CaCl_2$ concentration to simulate the HCl spent condition 0.5% CNC VES solution demonstrated a self-diverting property under the condition of total 20% HCl spent test and total 28% HCl test. Adding 0.5% PVP demonstrated the same self-diverting property but higher viscosity.

Figure 17:
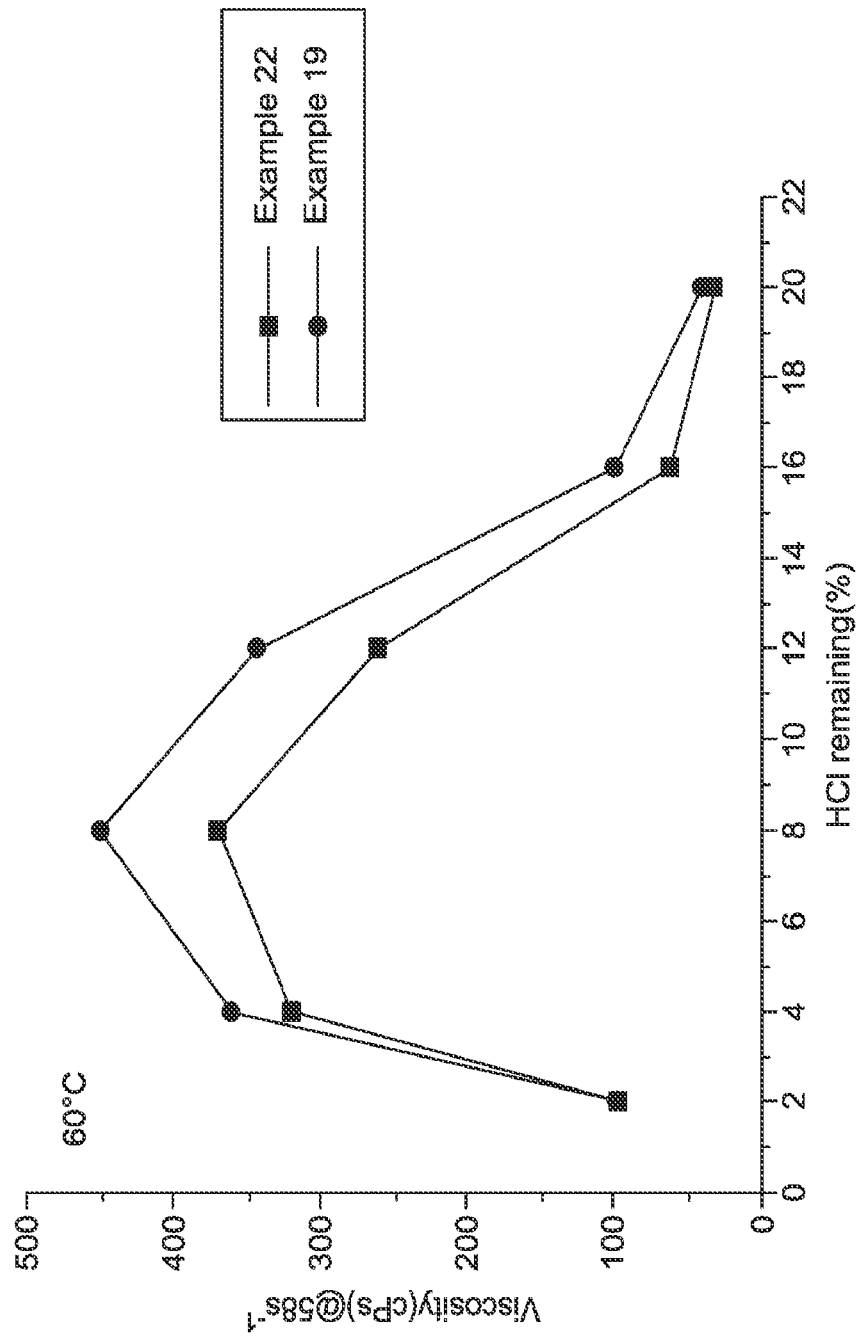
FIG. 17 shows HCl spending test in comparing in comparing between Examples 19 and 22.

The self-diverting acid property of the composition by HCl spending test are shown in FIG. 17. FIG. 17 shows the viscosities based PVP.

0.5% CNC VES solution demonstrates a self-diverting property under the condition of total 20% HCl spent test and total 28% HCl test.

Adding 0.5% PVP demonstrates the same self-diverting property but higher viscosity.

Further studies were made on these polymers (FIGS. 18 to 20) based on viscosity at a higher Temperature:

G-2. Example B

Compositions was produced by mixing components shown in tables 8 and 9. The compositions were obtained by the same operations as above.

TABLE 8

| wt % | Example | | | | | | | | |
|---|---|---|---|---|---|---|---|---|---|
| | 23 | 24 | 25 | 26 | 27 | 28 | 29 | 30 | 31 |
| CTAB*1 | 3.0 | 3.0 | 3.0 | 3.0 | 3.0 | 3.0 | 3.0 | 3.0 | 3.0 |
| NaSal*2 | 0.5 | 0.5 | 0.5 | 0.5 | 0.5 | 0.5 | 0.5 | 0.5 | 0.5 |
| sulfated-CNC *3 | 0.5 | 0.5 | 0.5 | 0.5 | 0.5 | 0.5 | 0.5 | 0.5 | 0.5 |
| PVP (Mw 10000)*4 | 0.5-3.0 | — | — | — | — | — | — | — | — |
| PVP (Mw 40000)*5 | — | 0.5-3.0 | — | — | — | — | — | — | — |
| P4VP *6 | — | — | 0.5-3.0 | — | — | — | — | — | — |
| PAG A (Mw 84000)*7 | — | — | — | 0.5-3.0 | — | — | — | — | — |
| PAG B (Mw 44000) *8 | — | — | — | — | 0.5-3.0 | — | — | — | — |
| PAG C (Mw 11000) *9 | — | — | — | — | — | 0.5-3.0 | — | — | — |
| PEI*10 | — | — | — | — | — | — | 0.5-3.0 | — | — |
| PA*11 | — | — | — | — | — | — | — | 0.5-3.0 | — |

| wt % | Comparative Example | | | | | | | | |
|---|---|---|---|---|---|---|---|---|---|
| | 4 | 5 | 6 | 7 | 8 | 9 | 10 | 11 | 12 |
| CTAB*1 | 3.0 | 3 | 3 | 3 | 3 | 3 | 3 | 3 | 3 |
| NaSal*2 | 0.5 | 0.5 | 0.5 | 0.5 | 0.5 | 0.5 | 0.5 | 0.5 | 0.5 |
| sulfated-CNC *3 | — | — | — | — | — | — | — | — | — |
| PVP (Mw 10000)*4 | 0.5 | — | — | — | — | — | — | — | — |
| PVP (Mw 40000)*5 | — | 0.5 | — | — | — | — | — | — | — |
| P4VP *6 | — | — | 0.5 | — | — | — | — | — | — |
| PAG A (Mw 84000)*7 | — | — | — | 0.5 | — | — | — | — | — |
| PAG B (Mw 44000) *8 | — | — | — | — | 0.5 | — | — | — | — |
| PAG C (Mw 11000) *9 | — | — | — | — | — | 0.5 | — | — | — |
| PEI*10 | — | — | — | — | — | — | 0.5 | — | — |
| PA*11 | — | — | — | — | — | — | — | 0.5 | — |

*1CTAB: cetyl trimethyl ammonium bromide
*2NaSal: sodium salicylate
*3 sulfated-CNC: obtained from Celluforce
*4PVP (Mw =10000): polyvinylpyrrolidone (Mw = 40000) obtained by Sigma -Aldrich
*5PVP (Mw = 40000): polyvinylpyrrolidone (Mw = 10000) obtained by Sigma -Aldrich
*6 P4VP: poly (4-vinylpyidine) (Mw = 60000) obtained by Sigma -Aldrich
*7PAG A (Mw 84000): poly(ethylene glycol)-co-poly(propylene glycol)-co-poly(ethylene glycol) having Mw 84000 obtained by Sigma -Aldrich
*8 PAG B (Mw 44000): poly(ethylene glycol)-co-poly(propylene glycol)-co-poly(ethylene glycol) having Mw 44000 obtained by Sigma -Aldrich
*9 PAG C (Mw 11000): poly(ethylene glycol)-co-poly(propylene glycol)-co-poly(ethylene glycol) having Mw 11000 obtained by Sigma -Aldrich
*10PEI: polyethylene imine having Mw 10000 obtained by Sigma -Aldrich
*11PA: polyaniline having Mw 65000 obtained by Sigma -Aldrich The self-diverting acid property of the composition by HCl spending test are shown in FIG. 18. FIG. 18 (a) shows the viscosities of the composition containing PVP having Mw 10000. FIG. 18 (b) shows the viscosities of the composition containing PVP having Mw 10000. FIG. 18 (c) shows the viscosities of the composition containing P4VP.

PVP (Mw0000) demonstrated no big difference in viscosity, while PVP (Mw40000) demonstrated the increase in viscosity. This indicated the molecular weight of PVP will influence the viscosity of the VES solution. Comparing Polymer—only solution and No-additive solution, increase can be detected.

P4VP demonstrating no effective difference in viscosity. 1% demonstrating slightly increase, however, the difference is very slight.

Figure 19:
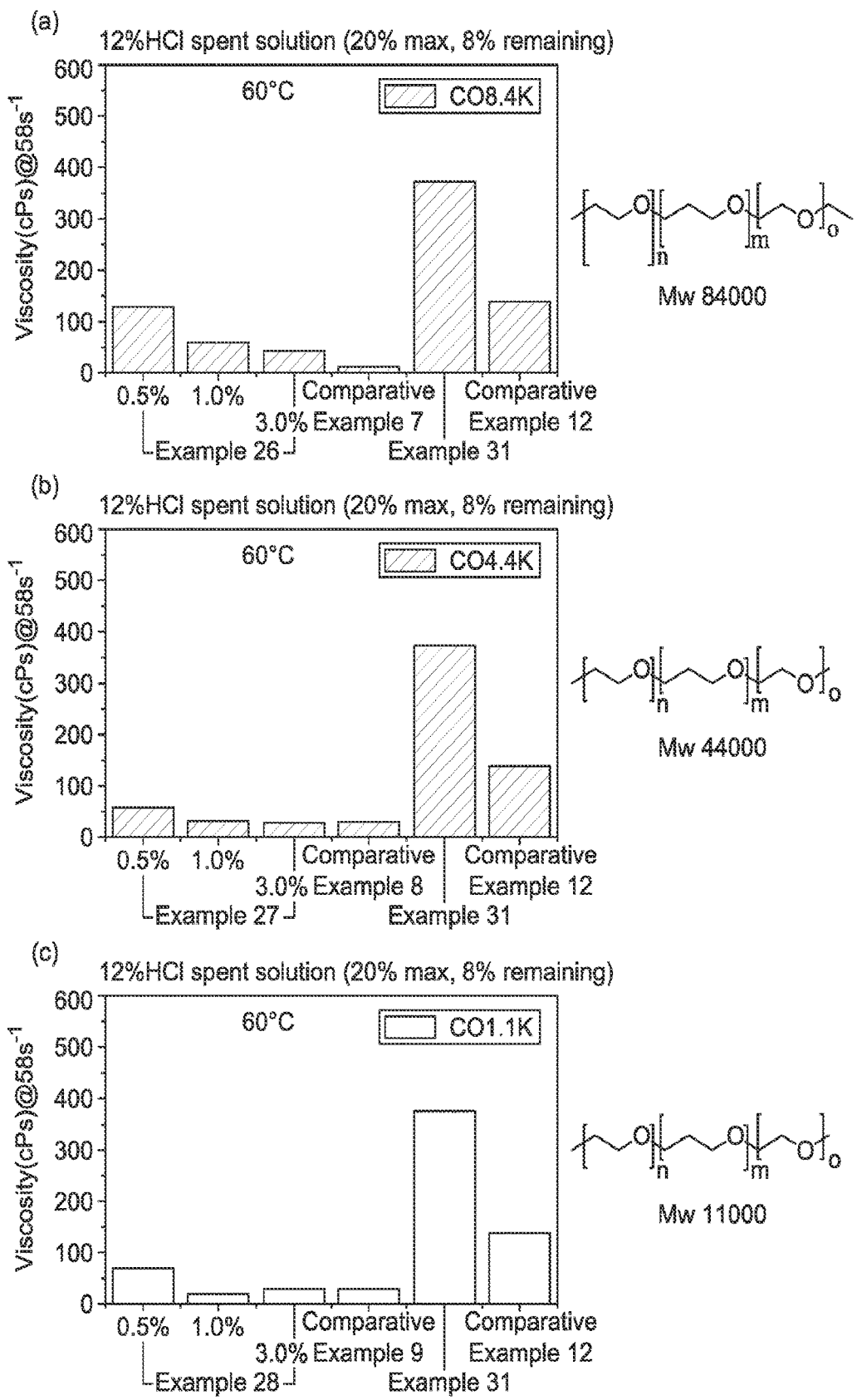
FIG. 19 shows HCl spending test in comparing in comparing between Examples 26 to 28 and 31, and Comparative Examples 7 to 9 and 12.

The self-diverting acid property of the composition by HCl spending test are shown in FIG. 19. FIG. 19 (a) shows the viscosities of the composition containing PAG A (Mw 84000). FIG. 22 (b) shows the viscosities of the composition containing PAG B (Mw 44000). FIG. 19 (c) shows the viscosities of the composition containing PAG C (Mw 11000).

The triblock copolymer of poly(ethylene glycol)-co-poly (propylene glycol)-co-poly(ethylene glycol) demonstrating a negative influence on the viscosity. By adding 0.5% of the polymer, the viscosity will drop to less than 200 cPs. With all 8.4 k, 4.4 k and 1.1 k, the viscosity does not have much difference, this indicates the result might be due to the amphiphilic block of the polymer, which will influence the micelle condition.

Figure 20:
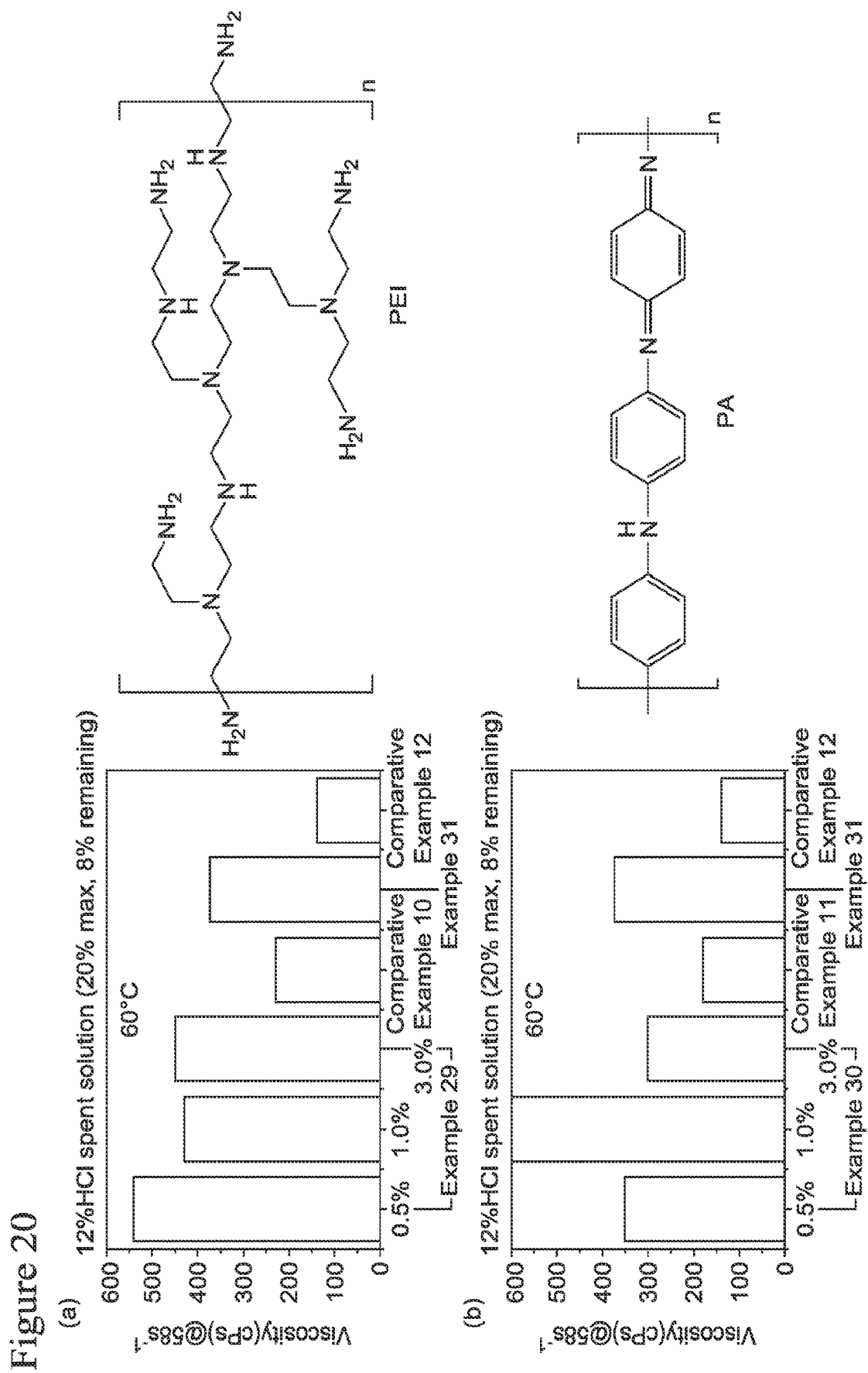
FIG. 20 shows HCl spending test in comparing in comparing between Examples 29 to 31 and Comparative Examples 10 to 12.

The self-diverting acid property of the composition by HCl spending test are shown in FIG. 20. FIG. 20 (a) shows the viscosities of the composition containing PAG A (Mw 84000). FIG. 20 (b) shows the viscosities of the composition containing PAG B (Mw 44000).

The polyethylene imine (PEI, Mw 10000. Branched) demonstrating a positive influence on the viscosity at 0.5%, with more than 0.5%, the viscosity might decrease. However, the influence on the viscosity is not very effective.

Polyaniline (PA. Mw 65000, emeraldine base) demonstrating a large increase in 1%, but no big difference at 0.5 wt % and 3%. This could be due to the acidic condition will transfer emeraldine base to quaternary salt and interact with the CNC In summary, eight different polymers in 3 different concentration were studied as co-additive. The results demonstrated PVP(40K) demonstrated an obvious increase in viscosity at 0.5%, 1%, which is consist with previous result. PVP(10K) and P4VP(65K) demonstrated no big difference with the viscosity. PEI(10K, branched) demonstrated a slight increase in viscosity. However, the triblock copolymer of poly(ethylene glycol)-co-poly(propylene glycol)-co-poly (ethylene glycol) degraded the viscosity of the VES solution.

Other embodiments of the present invention are as follows.

1. A composition for an oil or gas well formation, comprising:
   a viscoelastic surfactant; and
   a modified nanomaterial.
2. The composition of claim 1,
   wherein the nanomaterial comprises a nanocellulose.
3. The composition of claim 1 or 2,
   wherein the nanomaterial comprises at least a sulfate group, a sulfite group, a carboxy group, an ethylene oxide chain, an amino group, an ester group, a silane group or a tertiary ammonium group on its surface.
4. The composition of claim 3,
   wherein the nanoparticle comprises sulfate group on its surface.
5. The composition of any one of claims 1 to 4,
   wherein the modified nanomaterial has a grafted polymer on its surface.
6. The composition of any one of claims 1 to 5,
   wherein the viscoelastic surfactant comprises a surfactant and a counterion.
7. The composition of claim 6,
   wherein the counterion comprises an organic acid salt.
8. The composition of claim 6 or 7,
   wherein the counterion comprises at least a carboxylic acid salt or a sulfonic acid salt.
9. The composition of any one of claims 6 to 8,
   wherein the surfactant comprises at least one selected from the group consisting of cationic surfactants, anionic surfactants, zwitterionic surfactants and amphoteric surfactants.
10. The composition of any one of claims 6 to 9,
    wherein the surfactant comprises a compound of formula (1):

$$R^1-N(R^2)_3{}^+X^- \qquad (1)$$

wherein, $R^1$ is an aliphatic group having 10 to 20 carbon atoms, $R^2$ is an aliphatic group having 1 to 6 carbon atoms and $X^-$ is a negative ion.
11. The composition of any one of claims 1 to 10, further comprising:
    an additive which is at least one selected from the group consisting of:
    particles other than the nanoparticle;
    polymers; and
    molecules resulting in a nanostructured complex.
12. The composition of claim 11,
    wherein the polymer comprises at least polyacrylamide, poly(allylaminehydrochloride), poly(ethyleneglycol) polyethyleneimine or polyvinylalcohol.
13. A method of producing a composition, comprising:
    adding a modified nanomaterial; and
    adding a viscoelastic surfactant.
14. A method of forming an oil or gas well, comprising:
    preparing a fluid comprising:
    a solvent;
    a viscoelastic surfactant;
    a modified nanomaterial; and
    an acid material, and
    introducing the fluid into the well.

PATENTS

1. Whalen R T. Viscoelastic surfactant fracturing fluids and a method for fracturing subterranean formations: U.S. Pat. No. 6,035,936[P]. 2000-3-14.
2. Hughes T L. Jones T G J. Tustin G J. Viscoelastic surfactant based gelling composition for wellbore service fluids: U.S. Pat. No. 6,232,274[P]. 2001-5-15.
3. Dahayanake M S, Yang J, Niu J H Y, et al. Viscoelastic surfactant fluids and related methods of use: U.S. Pat. No. 6,258,859[P]. 2001-7-10.
4. Nelson E B. Lungwitz B. Dismuke K, et al. Viscosity reduction of viscoelastic surfactant based fluids: U.S. Pat. No. 6,881,709[P]. 2005-4-19.
5. Crews J B. Huang T. Use of nano-sized phyllosilicate minerals in viscoelastic surfactant fluids: U.S. Pat. No. 9,145,510[P]. 2015-9-29.

6. Pandya N K. Wadekar S D. Pathre G. S. Branched viscoelastic surfactant for high-temperature acidizing: U.S. Pat. No. 9,359,545[P]. 2016-6-7
7. Li L, Lin L, Abad C, et al. Acidic internal breaker for viscoelastic surfactant fluids in brine: U.S. Pat. No. 9,284,482[P]. 2016-3-15.
8. Huang T. Mutual solvent-soluble and/or alcohol blends-soluble particles for viscoelastic surfactant fluids: U.S. Pat. No. 8,653,012[P]. 2014-2-18.
9. Svoboda C, Moore L T, Evans F E. Viscoelastic surfactant based wellbore fluids and methods of use: U.S. Pat. No. 9,353,306[P]. 2016-5-31.
10. Gurmen H N. Fredd C N. Viscoelastic surfactant rheology modification: U.S. Pat. No. 9,034,806[P]. 2015-5-19.

LITERATURE PUBLICATIONS

1. Yang J. Viscoelastic wormlike micelles and their applications. Current opinion in colloid & interface science. 2002 Nov. 30:7(5):276-81.
2. Olsson U, Soederman O, Guering P. Characterization of micellar aggregates in viscoelastic surfactant solutions. A nuclear magnetic resonance and light scattering study. The Journal of Physical Chemistry. 1986 October; 90(21):5223-32.
3. Fischer P. Rehage H. Rheological master curves of viscoelastic surfactant solutions by varying the solvent viscosity and temperature. Langmuir. 1997 December 24:13(26):7012-20.
4. Samuel M, Poison D, Graham D, Kordziel W. Waite T, Waters G, Vinod PS, Fu D, Downey R. Viscoelastic surfactant fracturing fluids: applications in low permeability reservoirs. InSPE Rocky Mountain Regional/Low-Permeability Reservoirs Symposium and Exhibition 2000 Jan. 1. Society of Petroleum Engineers.
5. Lungwitz B R, Fredd C N, Brady E, Miller M J, Ali S A, Hughes K N. Diversion and cleanup studies of viscoelastic surfactant-based self-diverting acid. SPE Production & Operations. 2007 Feb. 1:22(01):121-7.
6. Huang T, Crews J B. Nanotechnology applications in viscoelastic surfactant stimulation fluids. SPE Production & Operations. 2008 Nov. 1:23(04):512-7.
7. Hoffmann H. Thunig C, Schmiedel P, Munkert U, Ulbricht W. The rheological behaviour of different viscoelastic surfactant solutions: systems with and without a yield stress value. Tenside, surfactants, detergents. 1994:31 (6):389-400.
8. Fischer P, Rehage H. Non-linear flow properties of viscoelastic surfactant solutions. Rheologica acta. 1997 Jan. 1:36(1):13-27.
9. Cooper-White J J, Crooks R C. Boger D V. A drop impact study of worm-like viscoelastic surfactant solutions. Colloids and Surfaces A: Physicochemical and Engineering Aspects. 2002 Oct. 16; 210(1):105-23.
10. Hull K L, Sayed M, Al-Muntasheri G A. Recent Advances in Viscoelastic Surfactants for Improved Production From Hydrocarbon Reservoirs[J]. SPE Journal, 2016.
11. Yang J, Lu Y, Zhou C, et al. Supramolecular Viscoelastic Surfactant Fluid for Hydraulic Fracturing[C]// SPE North Africa Technical Conference and Exhibition. Society of Petroleum Engineers. 2015.

The invention claimed is:
1. A composition for an oil or gas well formation, comprising:
   a viscoelastic surfactant, and
   a modified nanomaterial,
   wherein a weight ratio of the viscoelastic surfactant to the modified nanomaterial is from 1:1 to 20:1.
2. The composition according to claim 1, wherein the modified nanomaterial comprises a nanocellulose.
3. The composition according to claim 1, wherein the modified nanomaterial has, on a surface thereof, at least one selected from the group consisting of a sulfate group, a sulfite group, a carboxy group, an ethylene oxide chain, an amino group, an ester group, a silane group and a tertiary ammonium group.
4. The composition according to claim 3, wherein the modified nanomaterial has the sulfate group on the surface thereof.
5. The composition according to claim 1, wherein the modified nanomateriai has a grafted polymer on the surface thereof.
6. The composition according to claim 1, further comprising:
   a counterion compound having a counterion portion against to an ionic group of the viscoelastic surfactant.
7. The composition according to claim 6, wherein the counterion compound comprises an organic acid salt.
8. The composition according to claim 6, wherein the counterion compound comprises at least a carboxylic acid salt or a sulfonic acid salt.
9. The composition according to claim 6, wherein the viscoelastic surfactant comprises at least one selected from the group consisting of a cationic surfactant, an anionic surfactant, a zwitterionic surfactant and amphoteric surfactant.
10. The composition according to claim 6, wherein the viscoelastic surfactant comprises a compound of the following formula (1),

$$R^1-N(R^2)_3{}^+X^- \tag{1}$$

where wherein $R^1$ is an aliphatic group having 10 to 20 carbon atoms, $R^2$ is an aliphatic group having 1 to 6 carbon atoms and $X^-$ is a negative ion.
11. The composition according to claim 1, further comprising:
   a polymer, an additive, or a combination thereof.
12. The composition according to claim 11, wherein the polymer comprises at least one selected from the group consisting of polyacrylamide, poly(allylamine hydrochloride), poly(ethylene glycol) polyethyleneimine polyvinyl alcohol, poly(4-styrenesulfonic acid-co-maleic acid), polyvinylpyrrolidone, polyallylamine, poly(diallyl dimethyl ammonium), polyaniline, poly (4-vinyipyidine), and polyaniline emeraldine.
13. The composition according to claim 1, further comprising:
   a solvent.
14. A method of producing a composition, comprising:
   mixing a modified nanomaterial and a viscoelastic surfactant,
   wherein a weight ratio of the viscoelastic surfactant to the modified nanomaterial is from 1:1 to 20:1.
15. A method of forming an oil or gas well, comprising:
   preparing a fluid comprising a solvent, a viscoelastic surfactant, a modified nanomaterial, and an acid material; and
   introducing the fluid into an oil or gas well.
16. The composition according to claim 2, wherein the modified nanomaterial has, on a surface thereof, at least one selected from the group consisting of a sulfate group, a sulfite group, a carboxy group, an ethylene oxide chain, an amino group, an ester group, a silane group and a tertiary ammonium group.

17. The composition according to claim 16, wherein the modified nanomaterial has the sulfate group on the surface thereof.

18. The composition according to claim 2, wherein the modified nanomateriai has a grafted polymer on the surface thereof.

19. The composition according to claim 2, further comprising:
   a counterion compound having a counterion portion against to an ionic group of the viscoelastic surfactant.

20. The composition according to claim 19, wherein the counterion compound comprises an organic acid salt.

* * * * *